US010192049B2

(12) United States Patent
Polychronakis et al.

(10) Patent No.: US 10,192,049 B2
(45) Date of Patent: Jan. 29, 2019

(54) DETECTING RETURN-ORIENTED PROGRAMMING PAYLOADS BY EVALUATING DATA FOR A GADGET ADDRESS SPACE ADDRESS AND DETERMINING WHETHER OPERATIONS ASSOCIATED WITH INSTRUCTIONS BEGINNING AT THE ADDRESS INDICATE A RETURN-ORIENTED PROGRAMMING PAYLOAD

(71) Applicant: The Trustees of Columbia University in the City of New York, New York, NY (US)

(72) Inventors: Michalis Polychronakis, New York, NY (US); Angelos D. Keromytis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/349,445

(22) Filed: Nov. 11, 2016

(65) Prior Publication Data
US 2017/0243002 A1    Aug. 24, 2017

Related U.S. Application Data

(63) Continuation of application No. 14/344,458, filed as application No. PCT/US2012/055824 on Sep. 17, 2012, now Pat. No. 9,495,541.
(Continued)

(51) Int. Cl.
*G06F 21/54*    (2013.01)
*G06F 21/56*    (2013.01)

(52) U.S. Cl.
CPC ............ *G06F 21/54* (2013.01); *G06F 21/562* (2013.01); *G06F 2221/034* (2013.01)

(58) Field of Classification Search
CPC ....................................................... G06F 21/562
(Continued)

(56) References Cited

U.S. PATENT DOCUMENTS 5,398,196 A    3/1995   Chambers
5,696,822 A    12/1997  Nachenberg
(Continued)

FOREIGN PATENT DOCUMENTS

GB    2277151 B        6/1997
JP    2002368820 A    12/2002
(Continued)

OTHER PUBLICATIONS

Solar Designer, "Getting Around Non-Executable Stack (and Fix)", last updated Aug. 10, 1997, pp. 1-7, available at: http://seclists.org/bugtraq/1997/Aug/63.
(Continued)

*Primary Examiner* — Haresh N Patel
(74) *Attorney, Agent, or Firm* — Byrne Poh LLP

(57) ABSTRACT

Systems, methods, and media for detecting the presence of return-oriented programming (ROP) payloads are provided, comprising: identifying a potential gadget address space; determining if a piece of the data corresponds to an address of the potential gadget address space; and in response to determining that the piece of the data corresponds to an address of the potential gadget address space: determining whether a plurality of operations, each associated one of a plurality instructions beginning at the address, indicates that an ROP payload is present in the data, and indicating that an ROP payload is present in the data in response to making a
(Continued)

determination that a plurality of operations indicates that an ROP payload is present in the data a given number of times.

27 Claims, 4 Drawing Sheets

Related U.S. Application Data

(60) Provisional application No. 61/535,288, filed on Sep. 15, 2011.

(58) Field of Classification Search
    USPC .......................................................... 726/23
    See application file for complete search history.

(56) References Cited

U.S. PATENT DOCUMENTS

| | | |
|---|---|---|
| 5,765,030 A | 6/1998 | Nachenberg et al. |
| 5,842,002 A | 11/1998 | Schnurer et al. |
| 5,889,943 A | 3/1999 | Ji et al. |
| 5,964,889 A | 10/1999 | Nachenberg |
| 5,968,113 A | 10/1999 | Haley et al. |
| 5,968,133 A | 10/1999 | Haley et al. |
| 5,978,917 A | 11/1999 | Chi |
| 6,006,328 A | 12/1999 | Drake |
| 6,067,535 A | 5/2000 | Hobson et al. |
| 6,079,031 A | 6/2000 | Haley et al. |
| 6,088,804 A | 7/2000 | Hill et al. |
| 6,154,876 A | 11/2000 | Haley et al. |
| 6,347,374 B1 | 2/2002 | Drake et al. |
| 6,357,008 B1 | 3/2002 | Nachenberg |
| 6,609,196 B1 | 8/2003 | Dickinson et al. |
| 6,681,331 B1 | 1/2004 | Munson |
| 6,698,016 B1 | 2/2004 | Ghizzoni |
| 6,701,440 B1 | 3/2004 | Kim et al. |
| 6,715,084 B2 | 3/2004 | Aaron et al. |
| 6,718,469 B2 | 4/2004 | Pak et al. |
| 6,775,780 B1 | 8/2004 | Muttik |
| 6,785,732 B1 | 8/2004 | Bates et al. |
| 6,785,818 B1 | 8/2004 | Sobel et al. |
| 6,873,988 B2 | 3/2005 | Herrmann et al. |
| 6,901,519 B1 | 5/2005 | Stewart et al. |
| 6,952,776 B1 | 10/2005 | Chess |
| 6,970,924 B1 | 11/2005 | Chu et al. |
| 6,983,380 B2 | 1/2006 | Ko |
| 7,065,657 B1 | 6/2006 | Moran |
| 7,069,583 B2 | 6/2006 | Yann et al. |
| 7,072,876 B1 | 7/2006 | Michael |
| 7,093,239 B1 | 8/2006 | Van der Made |
| 7,096,215 B2 | 8/2006 | Bates et al. |
| 7,107,618 B1 | 9/2006 | Gordon et al. |
| 7,146,305 B2 | 12/2006 | van der Made |
| 7,146,640 B2 | 12/2006 | Goodman |
| 7,155,708 B2 | 12/2006 | Hammes et al. |
| 7,185,367 B2 | 2/2007 | Munson |
| 7,225,343 B1 | 5/2007 | Honig et al. |
| 7,263,690 B1 * | 8/2007 | Shapiro ............... G06F 9/44589 712/227 |
| 7,331,062 B2 | 2/2008 | Alagna et al. |
| 7,334,262 B2 | 2/2008 | Szor |
| 7,334,263 B2 | 2/2008 | Szor |
| 7,356,736 B2 | 4/2008 | Natvig |
| 7,373,524 B2 | 5/2008 | Motsinger et al. |
| 7,380,274 B2 | 5/2008 | Dickinson |
| 7,392,543 B2 | 6/2008 | Szor |
| 7,409,717 B1 | 8/2008 | Szor |
| 7,412,723 B2 | 8/2008 | Blake et al. |
| 7,418,729 B2 | 8/2008 | Szor |
| 7,448,084 B1 | 11/2008 | Apap et al. |
| 7,487,544 B2 | 2/2009 | Schultz et al. |
| 7,490,266 B2 | 2/2009 | Keromytis et al. |
| 7,490,268 B2 | 2/2009 | Keromytis et al. |
| 7,496,896 B2 | 2/2009 | Vu |
| 7,496,898 B1 | 2/2009 | Vu |
| 7,506,170 B2 | 3/2009 | Finnegan |
| 7,523,500 B1 | 4/2009 | Szor et al. |
| 7,526,758 B2 | 4/2009 | Hasse et al. |
| 7,526,809 B2 | 4/2009 | Liang et al. |
| 7,577,991 B2 | 8/2009 | Huynh et al. |
| 7,603,715 B2 | 10/2009 | Costa et al. |
| 7,607,171 B1 | 10/2009 | Marsden et al. |
| 7,624,449 B1 | 11/2009 | Perriot |
| 7,627,893 B2 | 12/2009 | Corley et al. |
| 7,639,714 B2 | 12/2009 | Stolfo et al. |
| 7,644,441 B2 | 1/2010 | Schmid et al. |
| 7,647,589 B1 | 1/2010 | Dobrovolskiy et al. |
| 7,712,133 B2 | 5/2010 | Raikar et al. |
| 7,716,736 B2 | 5/2010 | Radatti et al. |
| 7,735,138 B2 | 6/2010 | Zhao |
| 7,748,038 B2 | 6/2010 | Olivier et al. |
| 7,788,699 B2 | 8/2010 | Largman et al. |
| 7,797,682 B2 | 9/2010 | Stocker |
| 7,818,781 B2 | 10/2010 | Golan et al. |
| 7,822,818 B2 | 10/2010 | Desouza et al. |
| 7,832,012 B2 | 11/2010 | Huddleston |
| 7,840,968 B1 | 11/2010 | Sharma et al. |
| 7,865,908 B2 | 1/2011 | Garg et al. |
| 7,877,807 B2 | 1/2011 | Shipp |
| 7,900,258 B2 | 3/2011 | Van Der Made |
| 7,913,306 B2 | 3/2011 | Apap et al. |
| 7,975,059 B2 | 7/2011 | Wang et al. |
| 7,979,889 B2 | 7/2011 | Gladstone et al. |
| 7,979,907 B2 | 7/2011 | Schultz et al. |
| 8,074,115 B2 | 12/2011 | Stolfo et al. |
| 8,108,929 B2 | 1/2012 | Agrawal |
| 8,135,994 B2 | 3/2012 | Keromytis et al. |
| 8,214,900 B1 | 7/2012 | Satish et al. |
| 8,341,743 B2 | 12/2012 | Rogers et al. |
| 8,407,785 B2 * | 3/2013 | Sidiroglou ............... H04L 51/12 726/22 |
| 8,528,086 B1 | 9/2013 | Aziz |
| 8,601,322 B2 | 12/2013 | Stolfo et al. |
| 8,701,189 B2 * | 4/2014 | Saraf .................. G06F 21/566 370/230 |
| 8,763,103 B2 * | 6/2014 | Locasto ............... H04L 63/1408 709/224 |
| 9,143,518 B2 | 9/2015 | Sidiroglou et al. |
| 2001/0020255 A1 | 9/2001 | Hofmann et al. |
| 2001/0033656 A1 | 10/2001 | Gligor et al. |
| 2002/0026605 A1 | 2/2002 | Terry |
| 2002/0066034 A1 | 5/2002 | Schlossberg et al. |
| 2002/0078382 A1 | 6/2002 | Sheikh et al. |
| 2002/0083175 A1 | 6/2002 | Afek et al. |
| 2002/0095607 A1 | 7/2002 | Lin-Hendel |
| 2002/0133721 A1 | 9/2002 | Adjaoute |
| 2002/0162026 A1 | 10/2002 | Neuman et al. |
| 2002/0194490 A1 | 12/2002 | Halperin et al. |
| 2003/0065926 A1 | 4/2003 | Schultz et al. |
| 2003/0070003 A1 | 4/2003 | Chong et al. |
| 2003/0145225 A1 | 7/2003 | Bruton, III et al. |
| 2003/0172305 A1 | 9/2003 | Miwa |
| 2003/0204632 A1 | 10/2003 | Willebeek-LeMair et al. |
| 2003/0217277 A1 | 11/2003 | Narayanan et al. |
| 2004/0015726 A1 | 1/2004 | Szor |
| 2004/0044912 A1 | 3/2004 | Connary et al. |
| 2004/0098618 A1 | 5/2004 | Kim et al. |
| 2004/0128543 A1 | 7/2004 | Blake et al. |
| 2004/0148520 A1 | 7/2004 | Talpade et al. |
| 2004/0153644 A1 | 8/2004 | McCorkendale et al. |
| 2004/0153823 A1 | 8/2004 | Ansari |
| 2004/0163079 A1 | 8/2004 | Noy et al. |
| 2005/0071655 A1 | 3/2005 | de Jong |
| 2005/0086333 A1 | 4/2005 | Chefalas et al. |
| 2005/0086630 A1 | 4/2005 | Chefalas et al. |
| 2005/0108562 A1 | 5/2005 | Khazan et al. |
| 2005/0166268 A1 | 7/2005 | Szor |
| 2005/0188272 A1 | 8/2005 | Bodorin et al. |
| 2005/0223238 A1 | 10/2005 | Schmid et al. |
| 2005/0273854 A1 | 12/2005 | Chess et al. |
| 2006/0010495 A1 | 1/2006 | Cohen et al. |
| 2006/0021029 A1 | 1/2006 | Brickell et al. |
| 2006/0021054 A1 | 1/2006 | Costa et al. |
| 2006/0080678 A1 | 4/2006 | Bailey et al. |

(56) References Cited

U.S. PATENT DOCUMENTS

| | | | |
|---|---|---|---|
| 2006/0101516 | A1 | 5/2006 | Sudaharan et al. |
| 2006/0112342 | A1 | 5/2006 | Bantz et al. |
| 2006/0123244 | A1 | 6/2006 | Gheorghescu et al. |
| 2006/0143688 | A1 | 6/2006 | Futoransky et al. |
| 2006/0143709 | A1 | 6/2006 | Brooks et al. |
| 2006/0168329 | A1 | 7/2006 | Tan et al. |
| 2006/0193472 | A1 | 8/2006 | Yuen et al. |
| 2006/0264694 | A1 | 11/2006 | Viole et al. |
| 2006/0265694 | A1 | 11/2006 | Chilimbi et al. |
| 2006/0288415 | A1 | 12/2006 | Wong |
| 2007/0028220 | A1 | 2/2007 | Miller et al. |
| 2007/0074046 | A1 | 3/2007 | Czajkowski et al. |
| 2007/0283338 | A1 | 12/2007 | Gupta et al. |
| 2008/0016574 | A1 | 1/2008 | Tomaselli |
| 2008/0235764 | A1* | 9/2008 | Cohen ................. G06F 21/6281 726/1 |
| 2008/0313734 | A1* | 12/2008 | Rozenberg .......... H04L 63/1425 726/22 |
| 2009/0006074 | A1* | 1/2009 | Green ................. G06F 9/45504 703/28 |
| 2009/0037682 | A1 | 2/2009 | Armstrong et al. |
| 2009/0038008 | A1 | 2/2009 | Pike |
| 2010/0037038 | A1* | 2/2010 | Bieswanger .......... G06F 1/3203 712/220 |
| 2012/0167120 | A1* | 6/2012 | Hentunen ............... G06F 21/54 719/320 |
| 2014/0344932 | A1* | 11/2014 | Polychronakis ........ G06F 21/54 726/23 |

FOREIGN PATENT DOCUMENTS

| | | |
|---|---|---|
| KR | 1020010089062 | 9/2001 |
| WO | WO/1999/055052 | 10/1999 |
| WO | WO/1999/063727 | 12/1999 |

OTHER PUBLICATIONS

Sole, P., "Hanging on a ROPe", last updated Sep. 20, 2010, pp. 1-41, available at: http://www.immunitysec.com/downloads/DEPLIB20_ekoparty.pdf.

Somayaji, A. et al., "Principles of a Computer Immune System", In Proceedings of the New Security Paradigms Workshop, Langdale, UK, Sep. 23-26, 1997, pp. 75-82.

Somayaji, A.B., "Operating System Stability and Security through Process Homeostasis", Dissertation, Massachusetts Institute of Technology, Jul. 2002, pp. 1-198.

Song, D. et al., "A Snapshot of Global Internet Worm Activity", Technical Report, Arbor Networks, Nov. 2001, pp. 1-8.

Soni, S., "Understanding Linux Configuration Files", Technical Report, IBM developerWorks, Dec. 1, 2001, pp. 1-11, available at: http://www.ibm.com/developerworks/library/l-config/.

Sourceware, "Summary of GDB", last accessed Aug. 28, 2014, pp. 1, available at: https://sourceware.org/gdb/current/onlinedocs/gdb/Summary.html#Summary.

Spafford, E., "The Internet Worm Program: An Analysis", Technical Report, CSD-TR-823, Purdue University, Dec. 8, 1988, pp. 1-40.

Spinellis, D., "Reliable Identification of Bounded-Length Viruses is NP-Complete", In IEEE Transactions on Information Theory, vol. 49, No. 1, Jan. 2003, pp. 280-284.

Stamp, M., "Risks of Monoculture", In Communications of the Assosciation for Computing Machinery, vol. 47, No. 3, Mar. 2004, pp. 120.

Staniford, S. et al., "How to Own the Internet in Your Spare Time", In Proceedings of the 11th USENIX Security Symposium, San Francisco, CA, US, Aug. 5-9, 2002, pp. 149-167.

Stolfo, S. et al., "Detecting Viral Propagations Using Email Behavior Profiles", Technical Report, Columbia University, 2003, pp. 1-47.

Street, W.N., "A Streaming Ensemble Algorithm (SEA) for Large-Scale Classification", In Proceedings of the Seventh ACM SIGKDD International Conference on Knowledge Discovery and Data Mining, San Francisco, CA, US, Aug. 26-29, 2001, pp. 377-382.

Sugerman, J. et al., "Virtualizing I/O Devices on VMware Workstation's Hosted Virtual Machine Monitor", In Proceedings of the 2001 USENIX Annual Technical Conference, Boston, MA, US, Jun. 25-30, 2001, pp. 1-14.

Suh, G.E. et al., "Secure Program Execution via Dynamic Information Flow Tracking", In Proceedings of the 11th International Conference on Architectural Support for Programming Languages and Operating Systems (ASPLOS '04) Boston, MA, US, Oct. 7-13, 2004, pp. 85-96.

Sun, "SunSHIELD Basic Security Module Guide", Sun Microsystems, Inc., 1995, pp. 1-196.

Sun, "SunSHIELD Basic Security Module Guide", Sun Microsystems, Inc., 2000, pp. 1-239.

Supplementary European Search Report dated Apr. 16, 2015 in European Patent Application No. 12832510.7.

Symantec, "Happy99.Worm", Symantec.com, last updated Feb. 13, 2007, pp. 1-9, available at: http://www.symantec.com/qvcenter/venc/data/happy99.worm.html.

Symantec, "The Digital Immune System: Enterprise-Grade Anti-Virus Automation in the 21st Century", Technical Brief, Symantec, 2001, pp. 1-16.

Szor, P., "The Art of Computer Virus Research and Defense", Addison-Wesley Professional, Feb. 13, 2005, pp. 1-617.

Tandon, G., "Learning Rules From System Call Arguments and Sequences for Anomaly Detection", In Proceedings of ICDM Workshop on Data Mining for Computer Security (DMSEC '03), Melbourne, FL, US, Nov. 19, 2003, pp. 20-29.

Taylor, C. and Alves-Foss, J., "Nate-Network Analysis of Anomalous Traffic Events, A Low-Cost Approach", In New Security Paradigms Workshop (NSPW '01), Cloudcroft, NM, US, Sep. 10-13, 2002, pp. 89-96.

Techhit, "EZdetach", last updated Jun. 3, 2004, pp. 1-2, available at: https://web.archive.org/web/20040603143652/http://techhit.com/ezdetatch.

Teng, H.S. et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.

Toth, T. and Kruegel, C., "Connection-History Based Anomaly Detection", In Proceedings of the 2002 IEEE Workshop on Information Assurance and Security (IAS '02), West Point, NY, US, Jun. 17-19, 2002, pp. 30-35.

Toth, T. et al., "Accurate Buffer Overflow Detection via Abstract Payload Execution", In Proceedings of the 5th Symposium on Recent Advances in Intrusion Detection, Zurich, CH, Oct. 16-18, 2002, pp. 274-291.

Toyoizumi, H. et al., "Predators: Good Will Mobile Codes Combat Against Computer Viruses", In Proceedings of the 2002 Workshop on New Security Paradigms, Virginia Beach, VA, US, Sep. 23-26, 2002, pp. 11-17.

Tripwire, "Tripwire Intrusion Detection System 1.3 for Linux User Manual", Jul. 27, 1998, pp. 1-46.

Tripwire, Inc. "Tripwire 2.4 Reference Guide", 2001, pp. 1-140.

Tripwire, Inc. "Tripwire for Servers 2.4 User Guide", 2001, pp. 1-118.

Tsymbal, A., "The Problem of Concept Drift: Definitions and Related Work", Technical Report TCD-CS-2004-15, Department of Computer Science, Trinity College Dublin, IE, Apr. 2004, pp. 1-7.

Twycross, T. et al., "Implementing and Testing a Virus Throttle", In Proceedings of the 12th USENIX Security Symposium, Washington, DC, US, Aug. 4-8, 2003, pp. 285-294.

Tzermias, Z. et al, "Combining Static and Dynamic Analysis for the Detection of Malicious Documents", In Proceedings of the Fourth European Workshop on System Security, Salzburg, AT, Apr. 2011, pp. 1-6.

U.S. Appl. No. 10/352,342, filed Jan. 27, 2003.
U.S. Appl. No. 12/063,733, filed Feb. 13, 2008.
U.S. Appl. No. 12/091,150, filed Apr. 22, 2008.
U.S. Appl. No. 12/297,730, filed Dec. 4, 2009.
U.S. Appl. No. 13/301,741, filed Nov. 21, 2011.
U.S. Appl. No. 13/774,825, filed Feb. 22, 2013.

(56) References Cited

OTHER PUBLICATIONS

U.S. Appl. No. 60/308,623, filed Jul. 30, 2001.
U.S. Appl. No. 60/351,857, filed Jan. 25, 2002.
U.S. Appl. No. 60/709,170, filed Aug. 18, 2005.
U.S. Appl. No. 60/730,289, filed Oct. 25, 2005.
U.S. Appl. No. 61/535,288, filed Sep. 15, 2011.
Valcare, E.M. et al., excerpts from "Essence: An Experiment in Knowledge-Based Security Monitoring and Control", In USENIX Security Symposium III Proceedings, Baltimore, MD, US, Sep. 1992, pp. 155-169.
Vendicator, "Stack Shield: A 'Stack Smashing' Technique Protection Tool for Linux", Jan. 7, 2000, pp. 1, available at: http://angelfire.com/sk/stackshield.
Vigna, G. and Kemmerer, R.A., "NetSTAT: A Network-Based Intrusion Detection System", In Journal of Computer Security, vol. 7, No. 1, Sep. 1999, pp. 37-71.
Viljanen, L., "A Survey of Application Level Intrusion Detection", Technical Report, University of Helsinki, FL, Dec. 2004, pp. 1-32.
VMware, Inc., "VMware", available at: http://www.vmware.com/, last accessed: Jun. 2, 2017, pp. 1-4.
Wang, C. et al., "On Computer Viral Infection and the Effect of Immunization", In Proceedings of the 16th Annual Computer Security Applications Conference (ACSAC '00), New Orleans, LA, US, Dec. 11-15, 2000, pp. 246-256.
Wang, N. et al., "Y-Branches: When You Come to a Fork in the Road, Take It", In Proceedings of the 12th International Conference on Parallel Architectures and Compilation Techniques (PACT '03), New Orleans, LA, US, Sep. 27-Oct. 1, 2003, pp. 56-66.
Wang, X. et al., "SigFree: A Signature-free Buffer Overflow Attack Blocker", In Proceedings of the 15th USENIX Security Symposium, Vancouver, BC, CA, Jul. 31-Aug. 4, 2006, pp. 225-240.
Warrender, C. et al., "Detecting Intrusions Using System Calls: Alternative Data Models", In IEEE Symposium on Security and Privacy (S&P '99), Oakland, CA, US, May 9-12, 1999, pp. 133-145.
Webb, A.R., excerpts from "Statistical Pattern Recognition", Oxford University Press, 1999, pp. 347.
Whitaker, A. et al., "Scale and Performance in the Denali Isolation Kernel", In Proceedings of the Fifth Symposium on Operating Systems Design and Implementation (OSDI '02), Boston, MA, US, Dec. 9-11, 2002, pp. 195-209.
White Phosphorus, "White Phosphorous Exploit Pack", last updated Jul. 2, 2013, pp. 1-10, available at: http://www.whitephosphorus.org/.
White, S.R., "Anatomy of a Commercial-Grade Immune System", In Proceedings of the Ninth International Virus Bulletin Conference, Vancouver, BC, CA, Sep. 30, 1999, pp. 1-28.
White, S.R.,"Open Problems in Computer Virus Research", Technical Report, IBM Thomas J. Watson Research Center, Oct. 1998, pp. 1-10, available at: http://www.research.ibm.com/antivirus/SciPapers/White/Problems/Problems.html.
Whittaker, J., "No Clear Answers on Monoculture Issues", In IEEE Security & Privacy, vol. 1, No. 6, Nov. 2003, pp. 18-19.
Wicherski, G., "libscizzle", last updated Aug. 13, 2011, pp. 1, available at: http://code.mwcollect.org/projects/libscizzle.
Wilander, J. et al., "A Comparison of Publicly Available Tools for Dynamic Buffer Overflow Prevention", In Proceedings of the 10th Network and Distributed System Security Symposium, San Diego, CA, US, Feb. 6-7, 2003, pp. 1-14.
Williamson, M., "Throttling Viruses: Restricting Propagation to Defeat Malicious Mobile Code", Technical Report, HP Laboratories Bristol, Dec. 2002, pp. 1-9.
Witten, I.H. and Frank, E., "Data Mining: Practical Machine Learning Tools and Techniques with Java Implementations", 2000, pp. 1-369.
Wong, C., et al., "A Study of Mass-Mailing Worms", In Proceedings of the Assosciation for Computing Machinery Workshop on Rapid Malcode, Washington, DC, US, Oct. 29, 2004, pp. 1-10.
Xiong, J., "ACT: Attachment Chain Tracing Scheme for Email Virus Detection and Control", In Proceedings of the ACM Workshop on Rapid Malcode, Washington, DC, US, Oct. 29, 2004, pp. 11-22.
Ye, N., "A Markov Chain Model of Temporal Behavior for Anomaly Detection", In Proceedings of the IEEE Workshop on Information Assurance and Security (IAS '00), West Point, NY, US, Jun. 6-7, 2000, pp. 171-174.
Yeung, D.Y. and Ding, Y., "Host-Based Intrusion Detection using Dynamic and Static Behavioral Models", In Pattern Recognition, vol. 36, No. 1, Nov. 22, 2001, pp. 229-243.
Yin, J. et al., "Separating Agreement from Execution for Byzantine Fault Tolerant Services", In Proceedings of the 19th Assosciation for Computing Machinery Symposium on Operating Systems Principles, Bolton Landing, NY, US, Oct. 19-22, 2003, pp. 253-267.
Younan, Y. et al., "A Methodology for Designing Countermeasures Against Current and Future Code Injection Attacks", In Proceedings of the 3rd IEEE International Workshop on Information Assurance, College Park, MD, US, Mar. 23-24, 2005, pp. 3-20.
Yuan, L. et al., "Security Breaches as PMU Deviation: Detecting and Identifying Security Attacks Using Performance Counters", In Proceedings of the Second Asia-Pacific Workshop on Systems, Jul. 11, 2011, New York, NY, US, pp. 1-5.
Zhang, Q. et al., "Analyzing Network Traffic to Detect Self-Decrypting Exploit Code", In Proceedings of the 2nd Assosciation for Computing Machinery Symposium on Information, Computer and Communications Security, Singapore, Mar. 20-22, 2007, pp. 4-12.
Zhou, P. et al., "AccMon: Automatically Detecting Memory-Related Bugs Via Program Counter-Based Invariants", In Proceedings of the 37th International Symposium on Mircoarchitecture, Portland, OR, US, Dec. 4-8, 2004, pp. 269-280.
Zou, C. et al., "Code Red Worm Propagation Modeling and Analysis", In Proceedings of the 9th ACM Conference on Computer and Communications Security, Washington, DC, US, Nov. 18-22, 2002, pp. 138-147.
Zou, C. et al., "Email Worm Modeling and Defense", In Proceedings of the 3rd International Conference on Computer Communications and Networks, Chicago, IL, US, Oct. 11-13, 2004, pp. 409-414.
Zou, C. et al., "Feedback Email Worm Defense System for Enterprise Networks", Technical Report, University of Massachusetts, Apr. 2004, pp. 1-8.
Zou, C.C. et al., "Monitoring and Early Warning for Internet Worms", In Proceedings of the 10th ACM International Conference on Computer and Communications Security (CCS '03), Washington, DC, US, Oct. 27-30, 2003, pp. 190-199.
Zovi, D., "Practical Return-Oriented Programming", last updated Mar. 17, 2010, pp. 1-41, available at: http://365.rsaconference.com/servlet/JiveServlet/previewBody/2573-102-3-3232/RR-304.pdf.
Zweinenberg, R., excerpts from "Heuristics Scanners: Artificial Intelligence", In Proceedings of Virus Bulletin Conference, Boston, MA, US, Sep. 20-22, 1995, pp. 205-209.
Aleph One, "Smashing the Stack for Fun and Profit", In Phrack, vol. 7, No. 49, Nov. 1996, pp. 1-25.
Amarasinghe, S., "On the Run—Building Dynamic Program Modifiers for Optimization, Introspection, and Security", In Proceedings of the Conference on Programming Language Design and Implementation, Berlin, DE, Jun. 17-19, 2002, pp. 1-2.
Anderson, D. et al., "Next-Generation Intrusion Detection Expert System (NIDES): A Summary", Technical Report, SRI International , May 1995, pp. 1-47.
Apap, F. et al., "Detecting Malicious Software by Monitoring Anomalous Windows Registry Accesses", In Proceedings of the 5th International Symposium on Recent Advances in Intrusion Detection (RAID '02), Zurich, CH, Oct. 16-18, 2002, pp. 36-53.
Armstrong, D. et al., "Controller-Based Autonomic Defense System", In Proceedings of the 3rd Defense Advanced Research Project Agency Information Survivability Conference and Exposition, Washington, DC, US, Apr. 22-24, 2003, pp. 21-23.
Arnold, W. and Tesauro, T., "Automatically Generated WIN32 Heuristic Virus Detection", In Virus Bulletin Conference, Orlando, FL, US, Sep. 28-29, 2000, pp. 51-60.

(56) References Cited

OTHER PUBLICATIONS

Ashcraft, K. and Engler, D., "Using Programmer-Written Compiler Extensions to Catch Security Holes", In Proceedings of the 2002 IEEE Symposium on Security and Privacy (S&P '02), Berkeley, CA, US, May 12-15, 2002, pp. 143-159.

Avizienis, A., "The N-Version Approach to Fault-Tolerant Software", In IEEE Transactions on Software Engineering, vol. SE-11, No. 12, Dec. 1985, pp. 1491-1501.

Axelsson, S., "A Preliminary Attempt to Apply Detection and Estimation Theory to Intrusion Detection", Technical Report, Department of Computer Engineering, Chalmers University of Technology, Mar. 13, 2000, pp. 1-11.

Bace, R.G., "Intrusion Detection", 1st edition, Macmillan Technical Publishing, Jan. 2000, pp. 1-322.

Baecher, P. et al., "libemu", Jul. 22, 2011, pp. 1-6, available at: http://libemu.carnivore.it/.

Baratloo, A. et al., "Transparent Run-Time Defense Against Stack Smashing Attacks", In Proceedings of the 2000 USENIX Annual Technical Conference (ATEC '00), San Diego, CA, US, Jun. 18-23, 2000, pp. 251-262.

Barbara, D. et al., "An Architecture for Anomaly Detection", In Applications of Data Mining in Computer Security, Advances in Information Security, vol. 6, May 31, 2002, pp. 63-76.

Barrantes, E.G. et al., "Randomized Instruction Set Emulation to Disrupt Binary Code Injection Attacks", In Proceedings of the 10th ACM Conference on Computer and Communications Security Conference (CCS '03), Washington, DC, US, Oct. 27-30, 2003, pp. 281-289.

Bauer, E. et al., "An Empirical Comparison of Voting Classification Algorithms: Bagging, Boosting, and Variants", In Machine Learning, vol. 36, No. 1-2, Jul. 1, 1999, pp. 105-139.

Baumgartner, K., "The ROP Pack", In Proceedings of the 20th Virus Bulletin International Conference, Vancouver, BC, CA, Sep. 29-Oct. 1, 2010, pp. 1-43.

Bell, T. et al., excerpts from "Modeling for Text Compression", In ACM Computing Surveys, vol. 21, No. 4, Dec. 1989, pp. 557-591.

Bellovin, S., "Distributed Firewalls", In ;login: Magazine, Nov. 1999, pp. 37-39.

Bhatkar, S. et al., "Address Obfuscation: An Efficient Approach to Combat a Broad Range of Memory Error Exploits", In Proceedings of the 12th USENIX Security Symposium (SSYM '03), Washington, DC, US, Aug. 4-8, 2003, pp. 105-120.

Bhattacharyya, M. et al., "MET: An Experimental System for Malicious Email Tracking", In Proceedings of the 2002 Workshop on New Security Paradigms, Virginia Beach, VA, US, Sep. 23-26, 2002, pp. 3-10.

Biles, S., "Detecting the Unknown with Snort and the Statistical Packet Anomaly Detection Engine (SPADE)", Technical Report, Computer Security Online Ltd., Tech Republic, 2003, pp. 1-9.

Bowyer, K. et al., "A Parallel Decision Tree Builder for Mining Very Large Visualization Datasets", In Proceedings of the IEEE International Conference on Systems, Man, and Cybernetics, Nashville, TN, US, Oct. 8-11, 2000, pp. 1888-1893.

Breiman, L., "Bagging Predictors", In Machine Learning, vol. 24, No. 2, Aug. 1, 1996, pp. 123-140.

Breiman, L., "Random Forests", In Machine Learning, vol. 45, No. 1, Oct. 1, 2001, pp. 5-32.

Brilliant, S. et al., "Analysis of Faults in an N-Version Software Experiment", in IEEE Transactions on Software Engineering, vol. 16, No. 2, Feb. 1990, pp. 238-247.

Bruening, D. et al., "An Infrastructure for Adaptive Dynamic Optimization", In Proceedings of the 1st IEEE Association for Computing Macinery International Symposium on Code Generation and Optimization, San Francisco, CA, US, Mar. 23-26, 2003, pp. 265-275.

Brunner, J., "The Shockwave Rider", Del Rey Books, Canada, 1975, pp. 1-248.

Buchanan, E. et al., "Return-Oriented Programming: Exploits Without Code Injection", Presentation, Black Hat USA, Las Vegas, NV, US, Aug. 2-7, 2008, pp. 1-53.

Bulba et al., "Bypassing StackGuard and StackShield", In Phrack Magazine, No. 56, May 1, 2000, pp. 1-8.

Caida, "OC48 Analysis—Trace Data Stratified by Applications", Technical Report, Center for Applied Internet Data Access, last modified Jul. 18, 2013, pp. 1, available at: http://www.caida.orgiresearch/traffic-analysis/byapplication/oc48/port_analysis_app.xml.

Candea, G. and Fox, A., "Crash-Only Software", In Proceedings of the 9th Workshop on Hot Topics in Operating Systems (HotOS-IX), Lihue (Kauai), HI, US, May 18-21, 2003, pp. 67-72.

Cannady, J. and Harrell, J. "A Comparative Analysis of Current Intrusion Detection Technologies", In Proceedings of the Fourth Conference on Technology for Information Security (TISC '96), May 1996, pp. 1-17.

Cannady, J.D., excerpts from "An Adaptive Neural Network Approach to Intrusion Detection and Response", Nova Southeastern University, 2000, pp. 19-21.

CERT, "'Code Red' Worm Exploiting Buffer Overflow in IIS Indexing Service DLL", Technical Report, CERT Advisory CA-2001-19, Jul. 19, 2001, pp. 1-3, available at: http://www.cert.org/advisories/CA-2001-19.html.

CERT, "Exploitation of Vulnerabilities in Microsoft RPC Interface", Technical Report, CERT Advisory CA-2003-19, Jul. 31, 2003, pp. 1-3.

CERT, "MS-SQL Server Worm", last updated Jan. 25, 2003, pp. 1-3, available at: http://www.cert.org/advisories/CA-2003-04.html.

CERT, "MyDoom.B Virus", last updated Jan. 30, 2004, pp. 1-5, available at: http://www.us-cert.gov/cas/alerts/SA04-028A.html.

CERT, "W32/Blaster Worm", last updated Aug. 14, 2003, pp. 1-3, available at: http://www.cert.org/advisories/CA-2003-20.html.

CERT, "W32/Sobig.F Worm", last updated Aug. 22, 2003, pp. 1-3, available at: http://www.cert.org/incident_notes/IN-2003-03.html.

Chan, P. et al., "A Machine Learning Approach to Anomaly Detection", Technical Report, Florida Institute of Technology, Mar. 2003, pp. 1-13.

Chaturvedi, A. et al., "Improving Attack Detection in Host-Based IDS by Learning Properties of System Call Arguments", In Proceedings of the IEEE Symposium on Security and Privacy, Oakland, CA, US, May 8-11, 2005, pp. 1-19.

Chebrolu, S., excerpts from "Feature Deduction and Ensemble Design of Intrusion Detection Systems", In Computers & Security, vol. 24, Jun. 2005, pp. 295-307.

Checkoway, S. et al., "Return-Oriented Programming Without Returns", In Proceedings of the 17th Association for Computing Machinery Conference on Computer and Communications Security, Chicago, IL, US, Oct. 4-8, 2010, pp. 559-572.

Chen, H. and Wagner, D., "MOPS: An Infrastructure for Examining Security Properties of Software", In Proceedings of the 9th ACM Conference on Computer and Communications Security (CCS '02), Washington, DC, US, Nov. 18-22, 2002, pp. 235-244.

Chen, P. et al., "DROP: Detecting Return-Oriented Programming Malicious Code", In Proceedings of the 5th International Conference on Information Systems Security, Berlin, DE, Dec. 14, 2009, pp. 163-177.

Chen, P.M. and Noble, B.D., "When Virtual is Better Than Real", In Proceedings of the 8th Workshop on Hot Topics in Operating System (HotOS '01), Elmau/Oberbayern, DE, May 20-23, 2001, pp. 133-138.

Chen, W. et al.,"Metasploit", last updated Jul. 2, 2013, pp. 1-13, available at: http://www.metasploit.com.

Chess, B., "Improving Computer Security Using Extended Static Checking", In Proceedings of the IEEE Symposium on Security and Privacy, Berkeley, CA, US, May 12-15, 2002, pp. 160-173.

Chew, M. and Song, D., "Mitigating Buffer Overflows by Operating System Randomization", Technical Report CMU-CS-02-197, Carnegie Mellon University, Dec. 2002, pp. 1-11.

Cho, S.B. and Han, S-J., "Two Sophisticated Techniques to Improve HMM-Based Intrusion Detection Systems", In Proceedings of the Sixth International Symposium on Recent Advances in Intrusion Detection (RAID '03), Pittsburgh, PA, US, Sep. 8-10, 2003, pp. 207-219.

(56) References Cited

OTHER PUBLICATIONS

Christodorescu, M. and Jha, S., "Static Analysis of Executables to Detect Malicious Patterns", In Proceedings of the 12th USENIX Security Symposium (SSYM '03), Washington, DC, US, Aug. 4-8, 2003, pp. 169-186.
Cisco Systems, Inc., "Using Network-Based Application Recognition and Access Control Lists for Blocking the 'Code Red' Worm at Network Ingress Points", Technical Report No. 27842, Aug. 2, 2006, pp. 1-8.
Cohen, F., "Computer Viruses: Theory and Experiments", In Computers & Security, vol. 6, No. 1, Feb. 1987, pp. 22-35.
Computer Economics, "Malicious Code Attacks Had $13.2 Billion Economic Impact in 2001", In Computer Economics, Sep. 2002, pp. 1, available at: http://www.computereconomics.com/cei/preess/pr92191.html.
Conover, M., "w00w00 on Heap Overflows", Technical Report, Jan. 1999, pp. 1-17, available at: http://www.w00w00.org/articles.html.
Corelan Team, "Corelan ROPDB", last updated Dec. 18, 2012, pp. 1-10, available at: https://www.corelan.be/index.php/security/corelan-ropdb/.
Cova, M. et al., "Detection and Analysis of Drive-by-Download Attacks and Malicious JavaScript Code", In Proceedings of the 19th International Conference on World Wide Web, Raleigh, NC, US, Apr. 26-30, 2010, pp. 281-290.
Cowan, C. et al., "FormatGuard: Automatic Protection From Printf Format String Vulnerabilites", In Proceedings of the 10th USENIX Security Symposium, Washington, DC, US, Aug. 13-17, 2001, pp. 191-199.
Cowan, C. et al., "PointGuard: Protecting Pointers From Buffer Overflow Vulnerabilities", In Proceedings of the 12th USENIX Security Symposium (SSYM '03), Washington, DC, US, Aug. 4-8, 2003, pp. 91-104.
Cowan, C. et al., "Stackguard: Automatic Adaptive Detection and Prevention of Buffer-Overflow Attacks", In Proceedings of the 7th USENIX Security Symposium (SSYM '98), San Antonio, TX, US, Jan. 26-29, 1998, pp. 63-78.
Cowan, C. et al., "SubDomain: Parsimonious Server Security", In Proceedings of the 14th USENIX System Administration Conference (LISA '00), New Orleans, LA, US, Dec. 3-8, 2000, pp. 1-20.
Crosby, S. et al., "Denial of Service via Algorithmic Complexity Attacks", In Proceedings of the 12th USENIX Security Symposium, Washington, DC, US, Aug. 4-8, 2003, pp. 29-44.
Cult Dead Cow, "Back Orifice", last accessed Jul. 2, 2013, pp. 1-2, available at: http://www.cultdeadcow.com/tools/bo.html.
Damashek, M., "Gauging Similarity with N-Grams: Language-Independent Categorization of Text", In Science, vol. 267, No. 5199, Feb. 10, 1995, pp. 843-848.
Dark-E, "AIM Recovery", last accessed Jul. 2, 2013, pp. 1, available at: http://www.dark-e.com/des/software/aim/index.shtml.
Davi, L. et al., "ROPdefender: A Detection Tool to Defend Against Return-Oriented Programming Attacks", last updated Mar. 19, 2010, pp. 1-21, available at: https://www.cs.jhu.eduhs/teaching/cs460/2013-fall/ROPdefender.pdf.
Demsky, B. and Rinard, M.C., "Automatic Data Structure Repair for Self-Healing Systems", In Proceedings of the 1st Workshop on Algorithms and Architectures for Self-Managing Systems, San Diego, CA, US, Jun. 11, 2003, pp. 1-6.
Demsky, B. et al., "Automatic Detection and Repair of Errors in Data Structures", In Proceedings of the ACM's Special Interest Group on Programming Languages' Conference on Object Oriented Programming, Systems, Languages, and Applications, Anaheim, CA, US, Oct. 26-30, 2003, pp. 78-95.
Denning, D., "An Intrusion Detection Model", In IEEE Transactions on Software Engineering, vol. SE-13, No. 2, Feb. 1987, pp. 222-232.
Diamond CS, "Diamond Computer System Products—DiamondCS RegistryProt", Jan. 23, 2001, pp. 1-2, available at: https://web.archive.org/web/20010123222600/http://www.diamondcs.com.au/html/registryprot.htm.
Didaci, L. et al., "Ensemble Learning for Intrusion Detection in Computer Networks", In Proceedings of the 8th Conference of the Italian Association of Artificial Intelligence (AIAA), Siena, IT, Sep. 2002, pp. 1-10.
Dierks, T. and Allen, C., "The TLS Protocol Version 1.0", Technical Report, Internet Engineering Task Force: RFC 2246, Jan. 1999, pp. 1-69, available at: http://www.ietf.org/rfc/rfc2246.txt.
Dietterich, T., "Ensemble Methods in Machine Learning", In Lecture Notes in Computer Science, vol. 1857, Dec. 2000, pp. 1-15.
Dietterich, T.G., "An Experimental Comparison of Three Methods for Constructing Ensembles of Decision Trees: Bagging, Boosting, and Randomization", In Machine Learning, vol. 40, No. 2, Aug. 1999, pp. 139-157.
Dolan-Gavitt, B., "Forensic Analysis of the Windows Registry in Memory", In Digital Investigation, vol. 5, Aug. 2008, pp. 526-532.
Dreger, H. et al., "Enhancing the Accuracy of Network-Based Intrusion Detection with Host-Based Context", In Proceedings of GI SIG SIDAR Conference on Detection of Intrusions and Malware and Vulnerability Assessment, Vienna, AT, Jul. 7-8, 2005, pp. 206-221.
Du, W., "Security Relevancy Analysis on the Registry of Windows NT 4.0", In Proceedings of the 15th Annual Computer Security Applications Conference (ACSAC '99), Phoenix, AZ, US, Dec. 6-10, 1999, pp. 331-338.
DuMouchel, W., "Computer Intrusion Detection Based on Bayes Factors for Comparing Command Transition Probabilities", Technical Report TR91, National Institute of Statistical Sciences, Feb. 1999, pp. 1-14.
Dunlap, G. et al., "ReVirt: Enabling Intrusion Analysis Through Virtual-Machine Logging and Replay", In Proceedings of the Fifth Symposium on Operating Systems Design and Implementation, Boston, MA, US, Dec. 9-11, 2002, pp. 211-224.
Egele, M. et al., "Defending Browsers Against Drive-By Downloads: Mitigating Heap-Spraying Code Injection Attacks", In Proceedings of the 6th International Conference on Detection of Intrusions and Malware, and Vulnerability Assessment, Como, IT, Jul. 9-10, 2009, pp. 88-106.
Endler, D., "Intrusion Detection Applying Machine Learning to Solaris Audit Data", In Proceedings of the 14th Annual Computer Security Applications Conference, Phoenix, AZ, US, Dec. 7-11, 1998, pp. 268-279.
Endler, D., "Intrusion Detection Using Solaris' Basic Security Module", last updated Nov. 3, 2010, pp. 1-8, available at: http://www.symantec.com/connect/articles/intrusion-detection-using-solaris-basic-security-module.
Engler, D. and Ashcraft, K., "RacerX: Effective, Static Detection of Race Conditions and Deadlocks", In Proceedings of the ACM Symposium on Operating Systems Principles (SOSP '03), Bolton Landing, NY, US, Oct. 19-22, 2003, pp. 237-252.
Erlingsson, U., "Low-Level Software Security: Attack and Defenses", Technical Report, Microsoft Corporation, Nov. 2007, pp. 1-44.
Eskin, E., "Adaptive Model Generation for Intrusion Detection Systems", In the Workshop on Intrusion Detection Systems ("WIDS"), 7th ACM Conference on Computer and Communications Security, Athens, GR, Nov. 1, 2000, pp. 1-14.
Eskin, E., "Anomaly Detection Over Noisy Data Using Learned Probability Distributions", In Proceedings of the 17th International Conference on Machine Learning, Stanford, CA, US, Jun. 29-Jul. 2, 2000, pp. 255-262.
Etoh, J., "GCC Extension for Protecting Applications From Stack-Smashing Attacks", Technical Report, IBM Research, Aug. 22, 2005, pp. 1-3, available at: http://www.trl.ibm.com/projects/security/ssp.
Exploit Database, "Offensive Security Exploit Database Archive", last updated Jul. 28, 2016, pp. 1-11, available at: http://www.exploit-db.com/.
Fan, W. and Stolfo, S.J., "Ensemble-based Adaptive Intrusion Detection", In Proceedings of the Second SIAM International Conference on Data Mining, Arlington, VA, US, Apr. 11-13, 2002, pp. 41-58.

(56) References Cited

OTHER PUBLICATIONS

Fan, W. et al., "Using Artificial Anomalies to Detect Unknown and Known Network Intrusions", In Proceedings of IEEE International Conference on Data Mining (ICDM '01), San Jose, CA, US, Nov. 29-Dec. 2, 2001, pp. 123-130.
Fan, W., "Systematic Data Selection to Mine Concept-Drifting Data Streams", In Proceedings of the 10th ACM SIGKDD International Conference on Knowledge Discovery and Data Mining, Seattle, WA, US, Aug. 22-25, 2004, pp. 128-137.
Feng, H.H. et al., "Anomaly Detection Using Call Stack Information", In Proceedings of the IEEE Symposium on Security and Privacy (S&P '03), Oakland, CA, US, May 11-14, 2003, pp. 62-77.
Flack, C. and Atallah, M.J., "A Toolkit for Modeling and Compressing Audit Data", Technical Report, Purdue University, Mar. 10, 1999, pp. 1-25.
Ford, R., "The Future of Virus Detection", Information Security Technical Report, vol. 9, No. 2, Apr.-Jun. 2004, pp. 19-26.
Forrest, S. et al., "A Sense of Self for Unix Processes", In Proceedings of the IEEE Symposium on Security and Privacy, Oakland, CA, US, May 6-8, 1996, pp. 120-128.
Forrest, S. et al., "Building Diverse Computer Systems", In Proceedings of the 6th Workshop on Hot Topics in Operating Systems (HotOS '97), Cape Cod, MA, US, May 5-6, 1997, pp. 67-72.
Frantzen, M. and Shuey, M., "StackGhost: Hardware Facilitated Stack Protection", In Proceedings of the 10th USENIX Security Symposium (SSYM '01), Washington, DC, US, Aug. 13-17, 2001, pp. 55-66.
Friedman, N. et al., "Efficient Bayesian Parameter Estimation in Large Discrete Domains", In Proceedings of the 11th Conference on Advances in Neural Information Processing Systems, Denver, CO, US, Nov. 30-Dec. 5, 1998, pp. 417-423.
Garfinkel, T. et al., "A Virtual Machine Introspection Based Architecture for Intrusion Detection", In Proceedings of the 10th Network and Distributed System Security Symposium (NDSS '03), San Diego, CA, US, Feb. 6-7, 2003, pp. 191-206.
Garfinkel, T., "Traps and Pitfalls: Practical Problems in System Call Interposition Based Security Tools", In Proceedings of the 10th Network and Distributed Systems Security Symposium (NDSS '03), San Diego, CA, US, Feb. 6-7, 2003, pp. 163-176.
Geer, Jr., D., "Monopoly Considered Harmful", In IEEE Security & Privacy, vol. 1, No. 6, Nov. 2003, pp. 14-17.
Ghosh, A.K. et al., "A Study in Using Neural Networks for Anomaly and Misuse Detection", In Proceedings of the 8th USENIX Security Symposium, Washington, DC, US, Aug. 23-26, 1999, pp. 1-12.
Ghosh, A.K. et al., "Learning Program Behavior Profiles for Intrusion Detection", In Proceedings of the Workshop on Intrusion Detection and Network Monitoring, Santa Clara, CA, US, Apr. 9-12, 1999, pp. 51-62.
Ghosh, A.K. et al., "Using Program Behavior Profiles for Intrusion Detection", In Proceedings of the SANS Third Conference and Workshop on Intrusion Detection and Response, Mar. 1999, pp. 1-7.
Goldberg, I. et al., "A Secure Environment for Untrusted Helper Applications (Confining the Wily Hacker)", In Proceedings of the 6th USENIX Security Symposium (SSYM '96), San Jose, CA, US, Jul. 22-25, 1996, pp. 1-14.
Goth, G., "Addressing the Monoculture", In IEEE Security & Privacy, vol. 99, No. 6, Nov./Dec. 2003, pp. 8-10.
Greyware, "Grr! Greyware Registry Rearguard", Aug. 17, 2000, pp. 1-7, available at: https://web.archive.org/web/20000817031817/http://www.greyware.com/software/grr/.
Grimes, R.A., "Malicious Mobile Code: Virus Protection for Windows", 1st Edition, O'Rielly Media, Newton, MA, Aug. 24, 2001, pp. 45-46.
Hall, L.O. et al., "Comparing Pure Parallel Ensemble Creation Techniques Against Bagging", In Proceedings of the Third IEEE International Conference on Data Mining (ICDM '03), Melbourne, FL, US, Nov. 19-22, 2003, pp. 533-536.
Hangal, S. and Lam, M.S., "Tracking Down Software Bugs Using Automatic Anomaly Detection", In Proceedings of the 24th International Conference on Software Engineering (ICSE '02), Orlando, FL, US, May 19-25, 2002, pp. 291-301.
Hedbom, H. et al., "A Security Evaluation of a Non-Distributed Version of Windows NT", In Proceedings of the Second Nordic Workshop on Secure Computer Systems (NORDSEC '97), Espoo, FL, Nov. 6-7, 1997, pp. 1-29.
Hennessy, J.L. and Patterson, D.A., "Computer Organization and Design: The Hardware/Software Interface," 2nd Edition, Aug. 1997, pp. 1-122.
Hensing, R., "Understanding DEP as a Mitigation Technology", last updated Jun. 12, 2009, pp. 1-5, available at: http://blogs.technet.com/b/srd/archive/2009/06/12/understanding-dep-as-a-mitigation-technology-part-1.aspx.
Hoagland, J. and Staniford, S., "Spade: Silicon Defense", Nov. 2000, pp. 1-4, available at: http://www.silicondefense.com/software/spice.
Hochberg, J.G. et al.," NADIR: A Prototype System for Detecting Network and File System Abuse", Technical Report, Los Alamos National Laboratory, Nov. 1992, pp. 1-22.
Hofmeyr, S. et al., "Intrusion Detection System Using Sequences of System Calls", In Journal of Computer Security, vol. 6, No. 3, Aug. 18, 1998, pp. 151-180.
Hoglund, G.W. et al., excerpts from "The 'ESSENCE' of Intrusion Detection: A Knowledge Based Approach to Security Monitoring and Control", In Proceedings of the International Conference in Industrial and Engineering Applications of Artificial Intelligence and Expert Systems, Austin, TX, US, May 31-Jun. 3, 1994, pp. 201-209.
Hollander, Y., "The Future of Web Server Security: Why Your Web Site is Still Vulnerable to Attack", Technical Report, 2001, pp. 1-9.
Holmes, L., "Windows PowerShell Cookbook", 2nd edition, O'Reilly Media, Aug. 2010, pp. 1-4.
Honig, A. et al., "Adaptive Model Generation: An Architecture for the Deployment of Data Mining-Based Intrusion Detection Systems", In Applications of Data Mining in Computer Security, May 2002, pp. 153-194.
Ilgun, K., excerpts from "USTAT: A Real-Time Intrusion Detection System for UNIX", In Proceedings of the 1993 IEEE Computer Society Symposium on Research in Security and Privacy, Oakland, CA, US, May 24-26, 1993, pp. 16-28.
Inoue, H. and Forrest, S., "Anomaly Intrusion Detection in Dynamic Execution Environments", In New Security Paradigms Workshop, Virginia Beach, VA, US, Sep. 23-26, 2002, pp. 52-60.
Inoue, H. and Forrest, S., "Generic Application Intrusion Detection", Technical Report, University of New Mexico, Mar. 26, 2002, pp. 1-14.
International Patent Application No. PCT/US2006/015080, filed Apr. 21, 2006.
International Patent Application No. PCT/US2006/032470, filed Aug. 18, 2006.
International Patent Application No. PCT/US2006/041591, filed Oct. 25, 2006.
International Patent Application No. PCT/US2012/055824, filed Sep. 17, 2012.
International Preliminary Report on Patentability dated Mar. 18, 2014 in International Patent Application No. PCT/US2012/055824.
International Preliminary Report on Patentability dated Mar. 19, 2009 in International Patent Application No. PCT/US2006/015080.
International Preliminary Report on Patentability dated Apr. 2, 2009 in International Patent Application No. PCT/US2006/041591.
International Preliminary Report on Patentability dated Apr. 30, 2009 In International Patent Application No. PCT/US2006/032470.
International Search Report and Written Opinion dated May 14, 2008 in International Patent Application No. PCT/US2006/032470.
International Search Report and Written Opinion dated Jun. 25, 2008 in International Patent Application No. PCT/US2006/041591.
International Search Report and Written Opinion dated Jul. 7, 2008 in International Patent Application No. PCT/US2006/015080.
International Search Report and Written Opinion dated Dec. 7, 2012 in International Patent Application No. PCT/US2012/055824.
Internet Engineering Task Force, "Intrusion Detection Exchange Format", last updated Oct. 15, 2010, pp. 1-2, available at: http://datatracker.ietf.org/wg/idwg/charter/.

(56) References Cited

OTHER PUBLICATIONS

Intrusion Inc. Product Website, Feb. 14, 2001, pp. 1, available at: https://web.archive.org/web/20010214040305/http://www.intrusion.com/Products/enterprise.shtml.
Ioannidis, J. et al, "Implementing Push-Back: Router-Based Defense Against DDoS Attacks", In Proceedings of the 9th Annual Symposium on Network and Distributed System Security, San Diego, CA, US, Feb. 2002, pp. 1-8.
Ioannidis, S. et al., "Implementing a Distributed Firewall", In Proceedings of the 7th ACM Conference on Computer and Communications Security (CCS '00), Athens, GR, Nov. 1-4, 2000, pp. 190-199.
Islam, M.M., "A Constructive Algorithm for Training Cooperative Neural Network Ensembles", In IEEE Transactions on Neural Networks, vol. 14, No. 4, Jul. 2003, pp. 820-834.
Janakiraman, R. et al., "Indra: A Peer-to-Peer Approach to Network Intrusion Detection and Prevention", In Proceedings of the 12th IEEE International Workshops on Enabling Technologies: Infrastructure for Collaborative Enterprises, Linz, AT, Jun. 9-11, 2003, pp. 226-231.
Javitz, H.S. and Valdes, A., "The NIDES Statistical Component: Description and Justification", Technical Report, SRI International, Computer Science Laboratory, Mar. 7, 1994, pp. 1-47.
Jim, T. et al., "Cyclone: A Safe Dialect of C", In Proceedings of the USENIX Annual Technical Conference (ATEC '02), Monterey, CA, US, Jun. 10-15, 2002, pp. 275-288.
Jones, R. et al., "Backwards-Compatible Bounds Checking for Arrays and Pointers in C Programs", In Proceedings of the Third International Workshop on Automated Debugging, Linkoping, SE, May 26-28, 1997, pp. 13-26.
Just, J.E. et al.,"Learning Unknown Attacks—A Start", In Proceedings of the 5th International Symposium on Recent Advances in Intrusion Detection (RAID '02), Zurich, CH, Oct. 16-18, 2002, pp. 158-176.
Kane Secure Enterprise, excerpts from "Detecting Administrator and Super User Misuse (Kane I)", 2000, pp. 1.
Kane Secure Enterprise, excerpts from "Detecting Stolen Passwords (Kane II)", 2000, pp. 1.
Kane Security Analyst, excerpts from "Kane Security Analyst Features & Benefits (Kane III)", 2000, pp. 2-3.
Kane, excerpts from "Advancing the Art of Intrusion Detection: The KSE Behavioral Profiling System (Kane IV)", 2000, pp. 2-5.
Kc, G.S. et al., "Countering Code-Injection Attacks With Instruction-Set Randomization", In Proceedings of the 10th ACM Computer and Communications Security (CCS '03) Conference, Washington, DC, US, Oct. 27-30, 2003, pp. 272-280.
Kean, E., "COSAK: Code Security Analysis Kit", Technical Report, Drexel University, Jan. 2004, pp. 1-17.
Kent, S. and Atkinson, R., "Security Architecture for the Internet Protocol", Technical Report, RFC 2401, Nov. 1998, pp. 1-60.
Kephart, J.O. et al., "A Biologically Inspired Immune System for Computers", In Artificial Life IV: Proceedings of the 4th International Workshop on the Synthesis and Simulation of Living Systems, Cambridge, MA, US, Jul. 6-8, 1994, pp. 130-139.
Kim, G.H. and Spafford, E.H., "Experiences with Tripwire: Using Integrity Checkers for Intrusion Detection", Purdue Technical Report, Feb. 1994, pp. 1-15.
Kim, G.H. and Spafford, E.H., "The Design and Implementation of Tripwire: A File System Integrity Checker", Purdue Technical Report, Nov. 1993, pp. 1-23.
Kim, G.H. and Spafford, E.H., "Writing, Supporting, and Evaluating Tripwire: A Publically Available Security Tool", Purdue Technical Report, Mar. 1994, pp. 1-25.
King, S.T. and Chen, P.M., "Backtracking Intrusions", In Proceedings of the 19th ACM Symposium on Operating Systems Principles 2003 (SOSP '03), Bolton Landing, NY, US, Oct. 19-22, 2003, pp. 223-236.
King, S.T. et al., "Operating System Support for Virtual Machines", In Proceedings of the USENIX Annual Technical Conference (ATEC '03), San Antonio, TX, US, Jun. 9-14, 2003, pp. 71-84.
Kiriansky, V. et al., "Secure Execution Via Program Shepherding", In Proceedings of the 11th USENIX Security Symposium (SSYM '02), San Francisco, CA, US, Aug. 5-9, 2002, pp. 191-205.
Klinkenberg, R., "Detecting Concept Drift with Support Vector Machines", In Proceedings of the Seventeenth International Conference on Machine Learning, Stanford, CA, US, Jun. 29-Jul. 2, 2000, pp. 1-8.
Knuth, D.E., "The Art of Computer Programming, vol. 1 Fundamental Algorithms", In Addison-Wesley, vol. 1, No. 3, Jul. 1997, pp. 1-664.
Kodialam, M. and Lakshman, T.V., "Detecting Network Intrusions via Sampling: A Game Theoretic Approach", In Proceedings of the 22nd Annual Joint Conference of the IEEE Computer and Communications Societies (INFOCOM '03), San Franciso, CA, US, Mar. 30-Apr. 3, 2003, pp. 1-10.
Kolter, J.Z. and Maloof, M., "Dynamic Weighted Majority: A New Ensemble Method for Tracking Concept Drift", In Proceedings of the Third International IEEE Conference on Data Mining, Melbourne, FL, US, Nov. 22, 2003, pp. 2-3.
Kolter, J.Z. and Maloof, M., "Learning to Detect Malicious Executables in the Wild", In Proceedings of the 10th International Conference on Knowledge Discovery and Data Mining (KDD '04), Seattle, WA, US, Aug. 22-25, 2004, pp. 470-480.
Korba, J., "Windows NT Attacks for the Evaluation of Intrusion Detection Systems", Thesis, Massachusetts Institute of Technology, Jun. 2000, pp. 1-102.
Kremer, H.S., excerpts from "Real-Time Intrusion Detection for Windows NT Based on Navy IT-21 Audit Policy", Thesis, Naval Post Graduate School, Monterey, CA, US, Sep. 1999, pp. 1-61.
Kruegel, C. et al., "On the Detection of Anomalous System Call Arguments", In Proceedings of the 8th European Symposium on Research in Computer Security, Gjovik, NO, Oct. 13-15, 2003, pp. 326-343.
Kruegel, C. et al., "Polymorphic Worm Detection Using Structural Information of Executables", In Proceedings of the 8th International Symposium on Recent Advances in Intrusion Detection, Seattle, WA, US, Sep. 7-9, 2005, pp. 207-226.
Krugel, C. et al., "Service Specific Anomaly Detection for Network Intrusion Detection", In Proceedings of the 2002 Association for Computing Machinery Symposium on Applied Computing, Madrid, ES, Mar. 10-14, 2002, pp. 201-208.
Lane, T. and Brodley, C.E., "Approaches to Online Learning and Concept Drift for User Identification in Computer Security", In AAAI Technical Report WS-98-07, Jul. 1998, pp. 1-5.
Lane, T. and Brodley, C.E., "Temporal Sequence Learning and Data Reduction for Anomaly Detection", In ACM Transactions on Information and System Security, vol. 2, No. 3, Aug. 1999, pp. 295-331.
LaPadula, L.J., "State of the Art in Anomaly Detection and Reaction", Technical Paper, The MITRE Corporation, Jul. 1999, pp. 1-37.
Larochelle, D. and Evans, D., "Statically Detecting Likely Buffer Overflow Vulnerabilites", In Proceedings of the 10th USENIX Security Symposium (SSYM '01), Washington, DC, US, Aug. 13-17, 2001, pp. 177-190.
Larson, E. et al., "High Coverage Detection of Input-Related Security Faults", In Proceedings of the 12th Conference on USENIX Security Symposium, Washington, DC, US, Aug. 4-8, 2003, pp. 121-136.
Laureano, M. et al., "Intrusion Detection in Virtual Machine Environments", In Proceedings of the 30th Euromicro Conference, Rennes, FR, Aug. 31-Sep. 4, 2004, pp. 520-525.
Lee, J.S. et al., "A Generic Virus Detection Agent on the Internet", In Proceedings of the 30th Annual Hawaii International Conference on System Sciences (HICSS '97), Wailea, HI, US, Jan. 7-10, 1997, pp. 210-219.
Lee, W. and Stolfo, S.J., "Data Mining Approaches for Intrusion Detection", In Proceedings of the 7th Conference on USENIX Security Symposium (SSYM '98), San Antonio, TX, US, Jan. 26-29, 1998, pp. 1-16.
Lee, W. et al., "A Data Mining Framework for Building Intrusion Detection Models", In Proceedings of the 1999 IEEE Symposium on Security and Privacy (S&P '99), Oakland, CA, US, May 9-12, 1999, pp. 120-132.

(56) References Cited

OTHER PUBLICATIONS

Lee, W. et al., "A Framework for Constructing Features and Models for Intrusion Detection Systems", In Assosciation of Computing Machinery Transactions on Information and System Security, vol. 3, No. 4, Nov. 2000, pp. 227-261.

Lee, W. et al., "Learning Patterns from Unix Process Execution Traces for Intrusion Detection", In Proceedings of the Association for the Advancement of Artificial Intelligence Workshop: AI Approaches to Fraud Detection, Providence, RI, US, Jul. 27, 1997, pp. 50-56.

Lee, W. et al., "Mining in a Data-Flow Environment: Experience in Network Intrusion Detection", In Proceedings of the ACM's Special Interest Group on Knowledge Discovery and Data Mining International Conference on Knowledge Discovery and Data Mining, San Diego, CA, US, Aug. 15-18, 1999, pp. 114-124.

Lee, W. et al., excerpts from "A Data Mining Approach for Building Cost-Sensitive and Light Intrusion Detection Models", In DARPA Quarterly Review, Nov. 2000, pp. 38-52.

Lee, W., "A Data Mining Framework for Constructing Features and Models for Intrusion Detection Systems", PhD Thesis, Columbia University, Jun. 1999, pp. 1-177.

Lee, W., "Real Time Data Mining-based Intrusion Detection", In DARPA Information Survivability Conference and Exposition II (DISCEX '01), Anaheim, CA, US, Jun. 12-14, 2001, pp. 89-100.

Lhee, K. and Chapin, S.J., "Type-Assisted Dynamic Buffer Overflow Detection", In Proceedings of the 11th USENIX Security Symposium (SSYM '02), San Francisco, CA, US, Aug. 5-9, 2002, pp. 81-90.

Liang, Z. et al., "Automatic Generation of Buffer Overflow Attack Signatures: An Approach Based on Program Behavior Models", In Proceedings of the 21st Annual Computer Security Applications Conference, Tucson, AZ, US, Dec. 5-9, 2005, pp. 215-224.

Liang, Z., "Isolated Program Execution: An Application Transparent Approach for Executing Untrusted Programs", In Proceedings of the 19th Annual Computer Security Applications Conference, Las Vegas, NV, US, Dec. 8-12, 2003, pp. 182-191.

Lin, M.J. et al., "A New Model for Availability in the Face of Self-Propagating Attacks", In Proceedings of the 1998 Workshop on New Security Paradigms (NSPW '98), Charlottesville, VA, US, Sep. 22-25, 1998, pp. 134-137.

Lippmann, R. et al., "The 1999 DARPA Off-Line Intrusion Detection Evaluation", In Computer Networks, vol. 34, No. 4, Oct. 2000, pp. 579-595.

Liston, T. et al., "On the Cutting Edge: Thwarting Virtual Machine Detection", Technical Report, Intelguardians, 2006, pp. 1-27.

Liston, T., "Welcome to My Tarpit: The Tactical and Strategic Use of LaBrea", Polytechnic, Feb. 17, 2003, pp. 1-4, available at: http://download.polytechnic.edu.na/pub4/download.sourceforge.net/pub/sourceforge/l/la/labrea/OldFiles/LaBrea-Tom-Liston-Whitepaper-Welcome-to-my-tarpit.txt.

Locasto, M. et al., "FLIPS: Hybrid Adaptive Intrusion Prevention", In Proceedings of the 8th International Symposium on Recent Advances in Intrusion Detection, Seattle, WA, US, Sep. 7-9, 2005, pp. 82-101.

Locasto, M.E. et al., "Application Communities: Using Monoculture for Dependability", In Proceedings of the 1st Workshop on Hot Topics in System Dependability (HotDep '05), Yokohama, JP, Jun. 30, 2005, pp. 1-5.

MacAfee, "Homepage—macafee.com", Online publication, last accessed Jun. 16, 2016, available at: http://www.mcafee.com.

Mahoney, M. et al., "Detecting Novel Attacks by Identifying Anomalous Network Packet Headers", Technical Report, Florida Institute of Technology, Oct. 2001, pp. 1-10.

Mahoney, M.V. and Chan, P.K., "An Analysis of the 1999 DARPA/Lincoln Laboratory Evaluation Data for Network Anomaly Detection", In Proceedings of the 6th International Symposium Recent Advances in Intrusion Detection, Pittsburgh, PA, US, Sep. 8-10, 2003, pp. 220-237.

Mahoney, M.V. and Chan, P.K., "Learning Nonstationary Models of Normal Network Traffic for Detecting Novel Attacks", In Proceedings of the ACM Interest Group on Knowledge Discovery and Data Mining International Conference on Knowledge Discovery and Data Mining, Edmonton, AB, CA, Jul. 23-26, 2002, pp. 376-385.

Mahoney, M.V., "Network Traffic Anomaly Detection Based on Packet Bytes", In Proceedings of the 2003 ACM Symposium on Applied Computing (SAC '03), Melbourne, FL, US, Mar. 9-12, 2003, pp. 346-350.

Malton, A., "The Denotational Semantics of a Functional Tree-Manipulation Language", In Computer Languages, vol. 19, No. 3, Jul. 1993, pp. 157-168.

Microsoft Corporation, "Microsoft Portable Executable and Common Object File Format Specification", Technical Report, Revision 6.0, Feb. 1999, pp. 1-77.

Microsoft, "Microsoft Outlook 2003", last updated Aug. 9, 2004, pp. 1-3, available at: https://web.archive.org/web/20040829001834/http://office.microsoft.com/en-us/FX010857931033.aspx.

Microsoft, "Structure of the Registry", last accessed Jan. 29, 2016, pp. 1-2, available at: http://msdn.microsoft.com/enus/library/windows/desktop/ms724946(v=vs.85).aspx.

Miller, T. et al., "Strlcpy and Strlcat-Consistent, Safe, String Copy and Concatenation", In Proceedings of the FREENIX Track: 1999 USENIX Annual Technical Conference, Monterey, CA, US, Jun. 6-11, 1999, pp. 131-144.

Miretskiy, Y. et al., "Avfs: An On-Access Anti-Virus File System", In Proceedings of the 13th USENIX Security Symposium, San Diego, CA, US, Aug. 9-13, 2004, pp. 73-88.

Moore, D. et al., "Code-Red: A Case Study on the Spread and Victims of an Internet Worm", In Proceedings of the 2nd Internet Measurement Workshop (IMW '02), Marseille, FR, Nov. 6-8, 2002, pp. 273-284.

Moore, D. et al., "Internet Quarantine: Requirements for Containing Self-Propagating Code", In IEEE Societies Twenty-Second Annual Joint Conference of the IEEE Computer and Communications, vol. 3, Mar. 30-Apr. 3, 2003, pp. 1901-1910.

Moore, D., "The Spread of the Sapphire/Slammer Worm", last updated Apr. 3, 2003, pp. 1-7, available at: http://www.silicondefense.com/research/worms/slammer.php.

Mori, A., "Detecting Unknown Computer Viruses—A New Approach", In Software Security Theories and Systems, vol. 3233, 2004, pp. 226-241.

Mosberger, D. et al., "httperf—A Tool for Measuring Web Server Performance", In Association for Computing Machinery's Special Interest Group on Measurement and Evaluation Performance Evaluation Review, vol. 26, No. 3, Dec. 1998, pp. 31-37.

Mukkamala, S., excerpts from "Intrusion Detection using an Ensemble of Intelligent Paradigms", In the Journal of Network and Computer Applications, vol. 28, No. 2, Apr. 2005, pp. 167-182.

Murray, J.D., "Windows NT Event Logging, Chapter 4: Windows NT Security Auditing", 1st Edition, O'Reilly Media, Sep. 1998, pp. 64-97.

Nachenberg, C., "Behavior Blocking: The Next Step in Anti-Virus Protection", last updated Mar. 19, 2002, pp. 1-7, available at: http://www.symantec.com/connect/articles/behavior-blocking-next-step-anti-virus-protection.

Nachenberg, C., "Computer Virus—Coevolution", In Communications of the Assosciation for Computing Machinery, vol. 40, No. 1, Jan. 1997, pp. 46-51.

Nethercote, N. et al., "Valgrind: A Program Supervision Framework", In Electronic Notes in Theoretical Computer Science, vol. 89, No. 2, Oct. 2003, pp. 44-66.

Newsome, J. and Song, D., "Dynamic Taint Analysis for Automatic Detection, Analysis, and Signature Generation of Exploits on Commodity Software", In Proceedings of the 12th Annual Network and Distributed System Security Symposium (NDSS '05), San Diego, CA, US, Feb. 3-4, 2005, pp. 1-17.

Nojiri, D. et al., "Cooperative Response Strategies for Large Scale Attack Mitigation", In Proceedings of the 3rd Defense Advanced Research Projects Agency Information Survivability Conference and Exposition, Washington, DC, US, Apr. 22-24, 2003, pp. 293-302.

Notice of Allowance dated Feb. 5, 2014 in U.S. Appl. No. 12/297,730.
Notice of Allowance dated Apr. 8, 2015 in U.S. Appl. No. 13/774,825.
Notice of Allowance dated Jun. 8, 2015 in U.S. Appl. No. 14/272,187.
Notice of Allowance dated Jul. 1, 2016 in U.S. Appl. No. 14/344,458.

(56) References Cited

OTHER PUBLICATIONS

Notice of Allowance dated Jul. 28, 2011 in U.S. Appl. No. 12/091,150.
Notice of Allowance dated Aug. 29, 2016 in U.S. Appl. No. 14/481,233.
Notice of Allowance dated Nov. 8, 2013 in U.S. Appl. No. 13/301,741.
Notice of Allowance dated Dec. 20, 2012 in U.S. Appl. No. 12/063,733.
NT Security, "Trojan/XTCP", Panda Software's Center for Virus Control, Jun. 22, 2002, pp. 1-3, available at: http://www.ntsecurity.net/Panda/Index.cfm?FuseAction=Virus&VirusID=659.
NW Internet, "Setup Trojan", last updated Mar. 6, 2005, pp. 1, available at: http://www.nwinternet.com/~pchelp/bo/setuptrojan.txt.
Snow, K. et al., "ShellOS: Enabling Fast Detection and Forensic Analysis of Code Injection Attacks", In Proceedings of the 20th USENIX Security Symposium, San Francisco, CA, US, Aug. 8-12, 2011, pp. 1-16.
Office Action dated Feb. 15, 2017 in European Patent Application No. 12832510.7.
Office Action dated Feb. 21, 2013 in U.S. Appl. No. 13/301,741.
Office Action dated Mar. 6, 2017 in U.S. Appl. No. 15/149,821.
Office Action dated Apr. 22, 2016 in U.S. Appl. No. 14/841,233.
Office Action dated Apr. 27, 2015 in U.S. Appl. No. 14/344,458.
Office Action dated Jun. 7, 2018 in U.S. Appl. No. 15/149,821.
Office Action dated Jun. 10, 2015 in U.S. Appl. No. 14/014,871.
Office Action dated Jun. 15, 2012 in U.S. Appl. No. 12/297,730.
Office Action dated Jun. 17, 2015 in European Patent Application No. 12832510.7.
Office Action dated Jun. 19, 2014 in U.S. Appl. No. 13/774,825.
Office Action dated Jun. 27, 2012 in U.S. Appl. No. 12/063,733.
Office Action dated Aug. 23, 2010 in U.S. Appl. No. 12/091,150.
Office Action dated Aug. 24, 2017 in U.S. Appl. No. 14/014,871.
Office Action dated Aug. 24, 2017 in U.S. Appl. No. 15/014,784.
Office Action dated Jan. 2, 2014 in U.S. Appl. No. 13/774,825.
Office Action dated Sep. 7, 2012 in U.S. Appl. No. 13/301,741.
Office Action dated Sep. 17, 2010 in U.S. Appl. No. 12/063,733.
Office Action dated Sep. 29, 2014 in U.S. Appl. No. 14/014,871.
Office Action dated Oct. 7, 2016 in U.S. Appl. No. 15/014,784.
Office Action dated Nov. 7, 2011 in U.S. Appl. No. 12/297,730.
Office Action dated Nov. 24, 2017 in U.S. Appl. No. 15/149,821.
Office Action dated Dec. 16, 2016 in U.S. Appl. No. 14/014,871.
Office Action dated Dec. 31, 2015 in U.S. Appl. No. 14/344,458.
Oplinger, J. et al., "Enhancing Software Reliability with Speculative Threads", In Proceedings of the 10th International Conference on Architectural Support for Programming Languages and Operating Systems, San Jose, CA, US, Oct. 5-9, 2002, pp. 184-196.
Paxson, V., "Bro: A System for Detecting Network Intruders in Real-Time", In Proceedings of the 7th USENIX Security Symposium, San Antonio, TX, US, Jan. 26-29, 1998, pp. 1-18.
Peterson, D.S. et al., "A Flexible Containment Mechanism for Executing Untrusted Code", In Proceedings of the 11th USENIX Security Symposium (SSYM '02), San Francisco, CA, US, Aug. 5-9, 2002, pp. 207-225.
Polychronakis, M. et al., "Comprehensive Shellcode Detection Using Runtime Heuristics", In Proceedings of the 26th Annual Computer Security Applications Conference, Austin, TX, US, Dec. 6-10, 2010, pp. 287-296.
Polychronakis, M. et al., "Emulation-Based Detection of Non-Self-Contained Polymorphic Shellcode", In Proceedings of the 10th International Conference on Recent Advances in Intrusion Detection, Gold Coast, AU, Sep. 5-7, 2007, pp. 87-106.
Polychronakis, M. et al., "Network-Level Polymorphic Shellcode Detection Using Emulation", In Proceedings of the Third Conference on Detection of Intrusions and Malware & Vulnerability Assessment, Berlin, DE, Jul. 13-14, 2006, pp. 54-73.
Porras, P.A. and Neumann, P.G., "Emerald: Event Monitoring Enabling Responses to Anomalous Live Disturbances", In Proceedings of the 20th National Information Systems Security Conference, Baltimore, MD, US, Oct. 7-10, 1997, pp. 353-365.

Postfix, "Postfix", last updated Jun. 17, 2016, pp. 1, available at: http://www.postfix.org.
Prasad, M. et al., "A Binary Rewriting Defense Against Stack Based Buffer Overflow Attacks", In Proceedings of the USENIX Annual Technical Conference, Boston, MA, US, Jun. 9-14, 2003, pp. 211-224.
Prevelakis, V. and Spinellis, D., "Sandboxing Applications", In Proceedings of the USENIX Annual Technical Conference (ATEC '01), Boston, MA, US, Jun. 25-30, 2001, pp. 119-126.
Prevelakis, V., "A Secure Station for Network Monitoring and Control", In Proceedings of the 8th USENIX Security Symposium (SSYM '99), Washington, DC, US, Aug. 23-26, 1999, pp. 1-8.
Provos, N. et al., "Preventing Privilege Escalation", In Proceedings of the 12th Conference on USENIX Security Symposium (Ssym'03), Washington, DC, US, Aug. 4-8, 2003, pp. 1-11.
Provos, N., "Improving Host Security with System Call Policies", In Proceedings of the 12th USENIX Security Symposium (SSYM '03), Washington, DC, US, Aug. 4-8, 2003, pp. 257-272.
Quinlan, J.R., "Bagging, Boosting and C4.5", In Proceedings of the Thirteenth National Conference on Artificial Intelligence, Portland, OR, US, Aug. 4-8, 1996, pp. 725-730.
Ramakrishnan, C.R., "Model-Based Vulnerability Analysis of Computer Systems", In Proceedings on the 2nd International Workshop on Verification Model Checking and Abstract Interpretation, Pisa, IT, Sep. 19, 1998, pp. 1-8.
Ratanaworabhan, P. et al., "Nozzle: A Defense Against Heap-Spraying Code Injection Attacks", In Proceedings of the 18th USENIX Security Symposium, Montreal, CA, Aug. 10-14, 2009, pp. 169-186.
Red Hat, "Configuring OpenSSH", Red Hat Enterprise Linux, accessed Aug. 15, 2014, pp. 1-6, available at: https://access.redhat.com/documentation/en-US/Red_Hat_Enterprise_Linux/7/html/System_Administrators_Guide/s1-ssh-configuration.html.
Reynolds, J. et al., "Online Intrusion Protection by Detecting Attacks with Diversity", In Proceedings of the 16th International Conference on Data and Applications Security, Cambridge, GB, Jul. 28-31, 2002, pp. 245-256.
Reynolds, J. et al., "The Design and Implementation of an Intrusion Tolerant System", In Proceedings of the International Conference on Dependable Systems and Networks, Bethesda, MD, US, Jun. 23-26, 2002, pp. 285-292.
Riley, M. et al., "Missed Alarms and 40 Million Stolen Credit Card Numbers: How Target Blew It", In Bloomberg Businessweek, Mar. 13, 2014, pp. 1-10, available at: http://www.businessweek.com/articles/2014-03-13/target-missedalarms-in-epic-hack-of-credit-card-data.
Rinard, M. et al., "A Dynamic Technique for Eliminating Buffer Overflow Vulnerabilities (and Other Memory Errors)", In Proceedings 20th Annual Computer Security Applications Conference (ACSAC '04), Tucson, AZ, US, Dec. 6-10, 2004, pp. 82-90.
Rinard, M. et al., "Enhancing Server Availability and Security Through Failure-Oblivious Computing", In Proceedings of the 6th Symposium on Operating Systems Design and Implementation, San Francisco, CA, US, Dec. 6-8, 2004, pp. 303-316.
Robichaux, P., "Managing the Windows NT Registry, Chapter 8: Administering the Windows NT Registry" 1st Edition, O'Reilly Media, Newton, MA, Apr. 1998, pp. 231-272.
Roesch, M., "Snort: Lightweight Intrusion Detection for Networks", In Proceedings of the 13th Conference on Systems Administration, Seattle, WA, US, Nov. 7-12, 1999, pp. 229-238.
Rosenblum, M. et al., "Using the SimOS Machine Simulator to Study Complex Computer Systems", In Association for Computing Machinery Transactions on Modeling and Computer Simulation, vol. 7, No. 1, Jan. 1997, pp. 78-103.
Rudys, A. and Wallach, D.S., "Transactional Rollback for Language-Based Systems", In Proceedings of the International Conference on Dependable Systems and Networks (DSN '02), Bethesda, MD, US, Jun. 23-26, 2002, pp. 439-448.
Rudys, A. et al., "Termination in Language-Based Systems", In Association for Computing Machinery Transactions on Information and System Security, vol. 5, No. 2, May 2002, pp. 138-168.

(56) References Cited

OTHER PUBLICATIONS

Russinovich, M. and Cogswell, B., "Filemon for Windows NT/9x", last updated Aug. 14, 2000, pp. 1-3, available at: https://web.archive.org/web/20000815094424/http://www.sysinternals.com/filemon.htm.
Russinovich, M. and Cogswell, B., "Regmon for Windows NT/9x", last updated Nov. 1, 2006, pp. 1-4. available at: https://web.archive/org/web/20000308184259/http://www.sysinternals.com/ntw2k/source/regmon.shtm.
Scholkopf, B. et al., "Estimating the Support of a High-Dimensional Distribution", Technical Report, Microsoft Research, Sep. 18, 2000, pp. 1-31.
Schonlau, M. and Theus, M., "Detecting Masquerades in Intrusion Detection Based on Unpopular Commands", In Information Processing Letters, vol. 76, No. 1-2, Nov. 2000, pp. 33-38.
Schonlau, M. et al., "Computer Intrusion: Detecting Masquerades", In Statistical Science, vol. 16, No. 1, Feb. 2001, pp. 58-74.
Schultz, M. et al., "MEF: Malicious Email Filter—A UNIX Mail Filter that Detects Malicious Windows Executables", In Proceedings of the FREENIX Track: 2001 USENIX Annual Technical Conference, Boston, MA, US, Jun. 25-30, 2001, pp. 245-252.
Schultz, M.G. et al., "Data Mining Methods for Detection of New Malicious Executables", In Proceedings of the IEEE Symposium on Security and Privacy (S&P '01), Oakland, CA, US, May 14-16, 2001, pp. 38-49.
Schwartzbard, A. and Ghosh, A.K., "Study in the Feasibility of Performing Host-based Anomaly Detection on Windows NT", In Proceedings of the 2nd International Workshop on Recent Advances in Intrusion Detection, West Lafayette, IN, US, Sep. 7-9, 1999, pp. 1-10.
Security Space, "Web Server Survey", last updated May 1, 2003, pp. 1, available at: http://www.securityspace.com/s_survey/data/200304/.
Sekar, R. et al. "Specification-Based Anomaly Detection: A New Approach for Detecting Network Intrusions", In Proceedings of the 9th ACM Conference on Computer and Communications Security (CCS '02), Washington, DC, US, Nov. 18-22, 2002, pp. 265-274.
Sekar, R. et al., "A Fast Automaton-Based Method for Detecting Anomalous Program Behaviors", In Proceedings of the IEEE Symposium on Security & Privacy (S&P '01), Oakland, CA, US, May 14-16, 2001, pp. 144-155.
Sekar, R. et al., "Model-Carrying Code: A Practical Approach for Safe Execution of Untrusted Applications", In Proceedings of the 19th Asssociation for Computing Machinery Symposium on Operating Systems Principles, Bolton Landing, NY, US, Oct. 19-22, 2003, pp. 15-28.
Seward, J. and Nethercote, N., "Valgrind, An Open-Source Memory Debugger for x86-GNU/Linux", Developer.Kde, May 5, 2003, pp. 1-6, available at: http://developerkde.org/~sewardj/.
Shacham, H. et al., "On the Effectiveness of Address-Space Randomization", In Proceedings of the 11th ACM Conference on Computer and Communications Security (CCS '04), Washington, DC, US, Oct. 25-29, 2004, pp. 298-307.
Shacham, H., "The Geometry of Innocent Flesh on the Bone: Return-into-libc Without Function Calls (On the x86)", In Proceedings of the 14th Asssociation for Computing Machinery Conference on Computer and Communications Security, Alexandria, VA, US, Oct. 29-Nov. 2, 2007, pp. 552-561.
Shavlik, J. et al., "Evaluating Software Sensors for Actively Profiling Windows 2000 Computer Users", In Proceedings of the 4th International Symposium on Recent Advances in Intrusion Detection (RAID '01), Davis, CA, US, Oct. 10-12, 2001, pp. 1-17.
Shoch, J. et al., "The 'Worm' Programs—Early Experiments with a Distributed Computation", In Communications of the Asssociation for Computing Machinery, vol. 22, No. 3, Mar. 1982, pp. 172-180.
Sidiroglou, S. and Keromytis, A.D., "A Network Worm Vaccine Architecture", In Proceedings of the Twelfth IEEE International Workshops on Enabling Technologies: Infrastructure for Collaborative Enterprises (WETICE '03), Workshop on Enterprise Security, Linz, AT, Jun. 9-11, 2003, pp. 220-225.
Sidiroglou, S. et al., "Building a Reactive Immune System for Software Services", In Proceedings of the 2005 USENIX Annual Technical Conference (USENIX '05), Anaheim, CA, US, Apr. 10-15, 2005, pp. 149-161.
Sidiroglou, S., and Keromytis, A.D., "Using Execution Transactions to Recover from Buffer Overflow Attacks", Technical Report, 2004, pp. 1-16.
Smaha, S.E., "Haystack: An Intrusion Detection System", In the Fourth Aerospace Computer Security Applications Conference (IEEE Cat. No. CH2619-5 '88), Orlando, FL, US, Dec. 12-16, 1988, pp. 37-44.
Smirnov, A. and Chiueh, T., "DIRA: Automatic Detection, Identification, and Repair of Control-Hijacking Attacks", In Proceedings of the 12th Symposium on Network and Distributed System Security (NDSS '05), San Diego, CA, US, Feb. 3-4, 2005, pp. 1-17.

\* cited by examiner

DETECTING RETURN-ORIENTED PROGRAMMING PAYLOADS BY EVALUATING DATA FOR A GADGET ADDRESS SPACE ADDRESS AND DETERMINING WHETHER OPERATIONS ASSOCIATED WITH INSTRUCTIONS BEGINNING AT THE ADDRESS INDICATE A RETURN-ORIENTED PROGRAMMING PAYLOAD

CROSS REFERENCE TO RELATED APPLICATION

This application is a continuation of U.S. patent application Ser. No. 14/344,458, now U.S. Pat. No. 9,495,541 filed Mar. 12, 2014, which is a national stage application under 35 U.S.C. § 371 of International Application No. PCT/US2012/055824, filed Sep. 17, 2012, which claims the benefit of U.S. Provisional Patent Application No. 61/535,288, filed Sep. 15, 2011, each of which is hereby incorporated by reference herein in its entirety.

STATEMENT REGARDING FEDERALLY SPONSORED RESEARCH OR DEVELOPMENT

This invention was made with government support under grants 0914312 awarded by the National Science Foundation, FA8750-10-2-0253 awarded by the Air Force Research Laboratory, and FA8650-10-C-7024 awarded by the Air Force Materiel Command Legal Office. The government has certain rights in the invention.

BACKGROUND

The exploitation of memory corruption vulnerabilities in server and client applications has been one of the prevalent means of system compromise and malware infection. By supplying a malicious input to a target application, an attacker can inject and execute arbitrary code, known as shellcode, in the context of a vulnerable process.

The prevalence of code injection attacks has led to the wide adoption of exploit mitigations based on non-executable memory pages, such as Data Execution Prevention (DEP), in recent versions of popular operating systems.

In turn, attackers are increasingly relying on return-oriented programming (ROP) to bypass these protections. ROP allows the execution of arbitrary code on a victim system without the need to inject any code. ROP relies on the execution of code that already exists in the executable address space of a process, but, instead of executing the code of a whole library function, ROP is based on the execution of a combination of tiny code fragments, dubbed "gadgets," scattered throughout code segments of the process. The execution order of the gadgets is controlled through a sequence of gadget addresses that is part of the attack payload. This means that an attacker can execute arbitrary code on the victim system by injecting only control data.

During an attack, each gadget called by an ROP payload transfers control to the next gadget through an indirect control transfer instruction that reads the sequence of gadget addresses contained in the injected ROP payload.

In order for the ROP payload to be able to control the execution of these gadgets using the gadget addresses stored in the ROP payload, the gadgets selected by the ROP payload are typically stored in non-volatile portion of executable memory space. For example, such a non-volatile portion of executable memory space would typically not be subject to address space layout randomization (ASLR). The executable memory space in which the gadgets are present can be referred to as gadget address space.

An example of an ROP payload and how it controls the execution of gadgets is shown in FIG. 1. As shown, an ROP payload can exist in data memory starting at an address X and each n byte(s) of data can be a new piece of the payload, where n is the address size used in the target system (e.g., such as four bytes). The instruction pointer (EIP) and the stack pointer (ESP) of the target system can be controlled by the ROP payload to cause it to call the desired gadgets.

More particularly, for example, initially, EIP and ESP may be initialized with values of 070072F7 and a memory address of X+n*1 as shown in FIG. 1. Any suitable mechanism can be used to give EIP and ESP these values. For example, a stack pivot instruction sequence can be used to set EIP and ESP.

This will cause the first gadget call (marked "1st" on the right side of FIG. 1) to occur. As shown, during this call, a "pop eax" instruction and a "ret" instruction are executed. The "pop eax" instruction causes the value (0x0010104) at the address (X+n*1) pointed to by the stack pointer (ESP) to be copied to register EAX, and causes ESP to be incremented by one memory address size (e.g., four bytes, assuming an address size of 32 bits). The "ret" (return) instruction causes the value at the address pointed to by the stack pointer (ESP) to be put into the instruction pointer (EIP) and causes ESP to be incremented by one address size. This "ret" command thus sets up the next gadget call (marked "2nd" on the right side of FIG. 1) at address 070015BB by setting the instruction pointer with the value (070015BB) at the address (X+n*2) pointed to by ESP. Other gadget calls (marked "3rd," "4th," and "5th" on the right of FIG. 1) can then be performed in the order specified by the addresses specified in the ROP payload. As can be seen, this allows ESP to be used as an "index" register for transferring control to the desired gadget according to the list of gadget addresses in the ROP payload.

Although gadgets may end with a "ret" instruction as shown in FIG. 1, other indirect control transfer instructions may also be used.

Accordingly, mechanisms for detecting return-oriented programming payloads are desirable.

SUMMARY

Systems, methods, and media for detecting the presence of return-oriented programming (ROP) payloads are provided.

In some embodiments, systems for detecting the presence of return-oriented programming (ROP) payloads are provided, the systems comprising: a hardware processor that: identifies a potential gadget address space; determines if a piece of the data corresponds to an address of the potential gadget address space; and in response to determining that the piece of the data corresponds to an address of the potential gadget address space: determines whether a plurality of operations, each associated one of a plurality instructions beginning at the address, indicates that an ROP payload is present in the data, and indicates that an ROP payload is present in the data in response to making a determination that a plurality of operations indicates that an ROP payload is present in the data a given number of times.

In some embodiments, methods for detecting the presence of return-oriented programming (ROP) payloads are provided, the methods comprising: identifying a potential gadget address space using a hardware processor; determining if a piece of the data corresponds to an address of the potential gadget address space using the hardware processor; and in response to determining that the piece of the data corresponds to an address of the potential gadget address space: determining, using the hardware processor, whether a plurality of operations, each associated one of a plurality instructions beginning at the address, indicates that an ROP payload is present in the data, and indicating, using the hardware processor, that an ROP payload is present in the data in response to making a determination that a plurality of operations indicates that an ROP payload is present in the data a given number of times.

In some embodiments, non-transitory computer-readable media containing computer-executable instructions that, when executed by a processor, cause the processor to perform a method for detecting the presence of return-oriented programming (ROP) payloads are provided, the method comprising: identifying a potential gadget address space; determining if a piece of the data corresponds to an address of the potential gadget address space; and in response to determining that the piece of the data corresponds to an address of the potential gadget address space: determining whether a plurality of operations, each associated one of a plurality instructions beginning at the address, indicates that an ROP payload is present in the data, and indicating that an ROP payload is present in the data in response to making a determination that a plurality of operations indicates that an ROP payload is present in the data a given number of times.

DETAILED DESCRIPTION

Systems, methods, and media for detecting the presence of return-oriented programming (ROP) payloads are provided.

In some embodiments, these mechanisms can identify ROP payloads in data such as network traffic or process memory buffers. These mechanisms can identify ROP payloads by speculatively driving the execution of code that already exists in the address space of a targeted process according to the data. For example, a code emulator can be used to speculatively execute code fragments (gadgets) that exist in the address space of the targeted process at valid memory addresses that are found in the data. If a call to a memory address found in the data causes a threshold number of unique gadget executions to occur, the data can be identified as containing an ROP payload.

In some embodiments, mechanisms for detecting the presence of ROP payloads can be implemented as part of, or in addition to, a shellcode detector that uses a CPU emulator to identify the execution behavior of various shellcode types using any suitable runtime heuristics. For example, in some embodiments, these mechanisms can be implemented as part of, or in addition to, the Nemu shellcode detector or the ShellOS shellcode detector.

Figure 2:
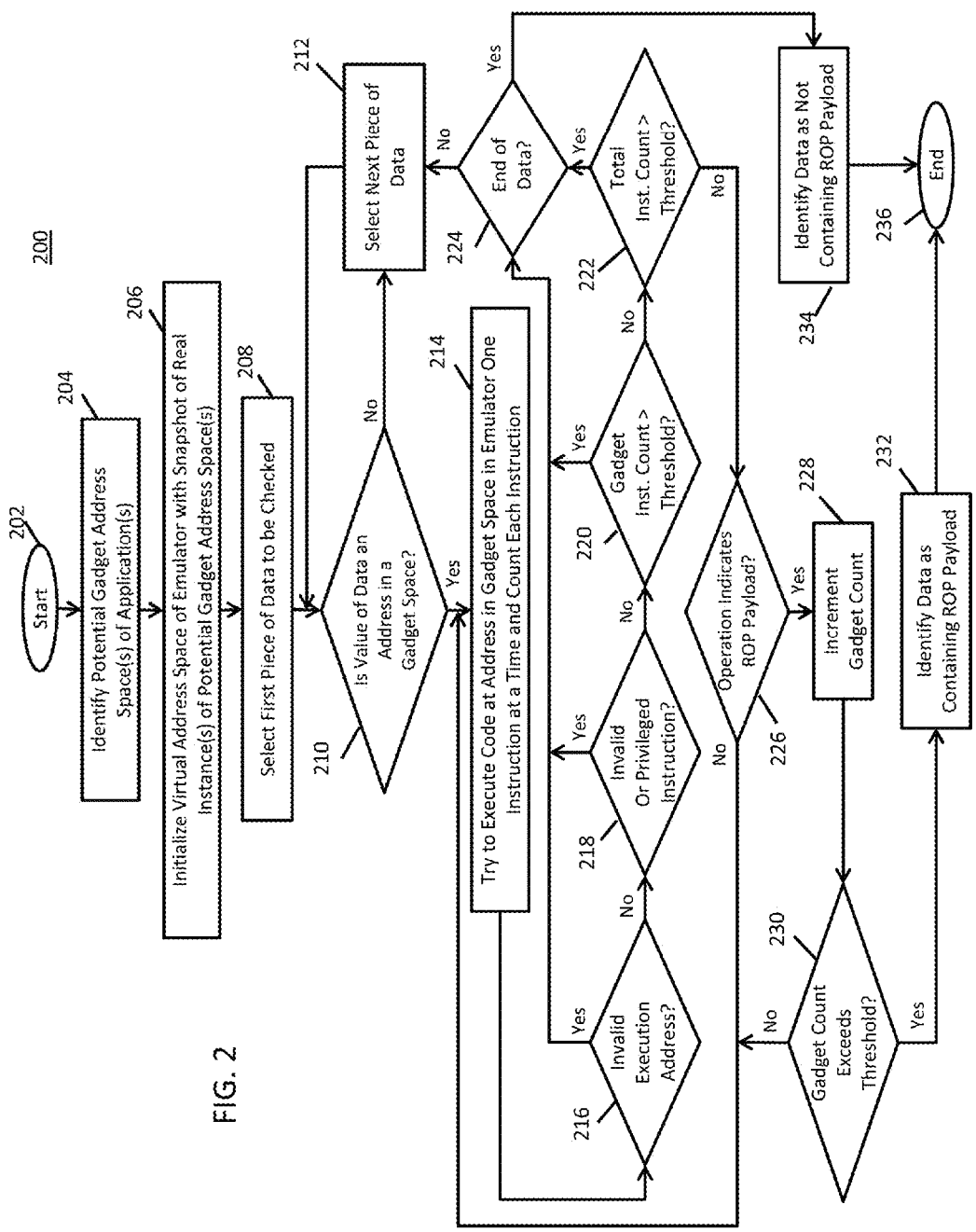
FIG. 2 is an example of a process for detecting ROP payloads in accordance with some embodiments.

Turning to FIG. 2, a process 200 that can be used to identify ROP payloads in accordance with some embodiments is shown. As illustrated, after process 200 begins at 202, the process identifies one or more potential gadget address spaces that may be used by an ROP payload at 204. These one or more gadget address spaces can be identified in any suitable manner. For example, in some embodiments, these gadget address spaces can be identified as being executable memory space that has non-volatile code (e.g., code not subject to ASLR) contained therein. As another example, in some embodiments, multiple gadget address spaces can be identified for one or more gadget address spaces or one or more applications. As yet another example, in some embodiments, multiple gadget address spaces can be identified for different versions of the same code, for different states of the same code (e.g., where the code changes from time to time, such as when using demand dynamic link libraries), for different memory layouts of the same code, for different contexts of the same code when used with different applications, etc.

Next, at 206, a virtual address space of an emulator is initialized with a snapshot of the process memory from an instance (e.g., such as a real instance) of identified one or more gadget address spaces. In some embodiments, different page tables can be maintained in the emulator to allow data to be checked for potential ROP payloads against multiple gadget spaces at the same time.

A first piece of data is next selected at 208. The data can be from any suitable source and can be in any suitable format. For example, the data can be from memory, from a buffer, from streaming content, from a storage device, from a file, from a message, etc. As another example, the data can be stored in groups of any suitable number of bytes (such as four), or bits (such as 32), can be ordered in any suitable arrangement (e.g., such as "little endian" or "big endian"), etc. As described below, the data can be stored in such a way to identify what is "original" data (i.e., data that has not be altered during execution of any gadgets) and non-original data, in some embodiments.

Process 200 then determines whether the value of the selected data corresponds to an address in any of the one or more address spaces of the emulator. For example, as shown in FIG. 3(a), one piece of data 302 has a value of "0072F741," which does not correspond to a valid address in gadget address space 304. As another example, as shown in FIG. 3(b), another piece of data 306 has a value of "070072F7," which does correspond to an address in gadget address space 304, as shown by detailed portion 308.

If process 200 determines that the value of the selected data does not correspond to a valid address in any of the one or more address spaces, then the process selects the next piece of data at 212. The next piece of data can be selected in any suitable manner. For example, the next piece of data can be selected by moving a selection window around multiple bytes by one byte. For example, as shown in FIGS. 3(a) and 3(b), when selecting the next piece of data, a window 310 selecting four bytes as a piece of data can be moved one byte to form a new window 312 selecting a different combination of four bytes as a piece of data.

Otherwise, if process 200 determines that the value of the selected data does correspond to a valid address in any of the one or more gadget address spaces, the process then attempts to beginning executing code at this address in the corresponding one or more gadget address spaces using the emulator at 214. This attempt can begin by setting EIP to the value of the selected data and by setting ESP to point to the next piece of data (e.g., as if the next piece of data were selected as described above in connection with 212). For example, as illustrated in FIG. 3(b), EIP can be set to "070072F7" and ESP can be set to point to the next piece of data.

As described above, this will cause a first gadget call to occur. During this call, a "pop eax" instruction and a "ret" instruction are executed. The "pop eax" instruction causes the value (0x0010104) at the address pointed to by the stack pointer (ESP) to be copied to register EAX, and causes ESP to be incremented by one memory address size (e.g., four bytes, as shown). The "ret" (return) instruction causes the value at the address pointed to by the stack pointer (ESP) to be put into the instruction pointer (EIP) and causes ESP to be incremented by one address size. This "ret" command thus sets up the next gadget call at address 070015BB by setting the instruction pointer with the value (070015BB) at the address then pointed to by ESP. As can be seen, this allows ESP to be used as an "index" register for transferring control to the desired gadget according to the list of addresses in the ROP payload.

In some embodiments, before attempting to execute instructions at an address in the gadget address space corresponding to a value of data, a determination can be made as to whether the address has been previously identified as corresponding to a gadget. If not, then 214 can be skipped and process 200 can branch directly to 224 (not shown in FIG. 2). Otherwise, 214 can be performed as described herein. Any suitable mechanism can be used to identify an address as corresponding to a gadget and to determine if an address has been previously identified as corresponding to a gadget.

In some embodiments, the emulator can allow the execution of the gadgets to continue as long as the instructions in the one or more gadgets manipulate the stack pointer correctly, and can terminate the execution for any one or more of the following reasons: i) a gadget transfers control to an invalid address; ii) the emulator encounters an invalid or privileged instruction; iii) the number of executed instructions in the current gadget reaches a certain threshold; or iv) the total number of executed instructions reaches an overall execution threshold.

In order to determine whether conditions iii) or iv) are present, the emulator can count the number of gadget instructions executed in the present gadget, as well as the total number of instructions executed in the present attempt to execute gadget code, that are executed by the emulator at 214 in some embodiments.

As shown in FIG. 2, process 200 can test for an invalid execution address at 216. Any suitable test for identifying an invalid execution address can be used in some embodiments. For example, the process can identify an invalid execution address if EIP is set to an address protected by DEP, to an address only accessible by the kernel, etc. If an invalid execution address is reached, then process 200 can branch to 224 to determine whether the end of the data has been reached as described below.

Otherwise, process 200 can branch to 218 where it can test for invalid or privileged instructions. Any suitable test for identifying invalid or privileged instructions can be used in some embodiments. For example, a random address in a benign input may fall into the middle of an actual instruction in one of the code segments and therefore be invalid. That byte may alternatively correspond to an opcode of a privileged instruction that only the kernel is allowed to execute. If an invalid or privileged instruction is reached, then process 200 can branch to 224 to determine whether the end of the data has been reached as described below.

Otherwise, process 200 can branch to 220 where it can determine whether the count of number of gadget instructions executed in the present gadget has reached and/or exceeded a threshold. This test can help distinguish between random code executions and gadget executions due to an ROP payload. In some cases, the typical size of gadgets used in Turing-complete implementations, as well as in typical exploits, ranges between 2-5 instructions, while the largest number of executed instructions in a single gadget may only be 10 instructions. In some embodiments, a threshold for the count of the number of gadget instructions executed in the present gadget can be set to 32 instructions or any other suitable number of instructions (e.g., such as less than 32 instructions). If the count of the number of gadget instructions executed in the present gadget has reached and/or exceeded the threshold, then process 200 can branch to 224 to determine whether the end of the data has been reached as described below.

Otherwise, process 200 can branch to 222 where it can determine whether the count of the total number of instructions executed in the present attempt has reached and/or exceeded a threshold. This test can ensure, for example, that the execution will stop in case the flow of control has been "trapped" into a loop or an overly long straight-through code path. Any suitable threshold can be used in some embodiments. For example, in some embodiments the threshold can be set to 500, 4096, and/or any other suitable value. If the count of the total number of instructions executed in the present attempt has reached and/or exceeded a threshold, then process 200 can branch to 224 to determine whether the end of the data has been reached as described below.

As described above, if it is determined at 216, 218, 220, or 224 that invalid execution address has been identified, that an invalid or privileged instruction has been identified, that the count of the number of executed instruction for the present gadget has reached a threshold, or that the count of the total number of instructions executed in the present attempt has reached a threshold, respectively, process 200 will branch to 224 where it can determine whether it is at the end of the data. This determination can be made in any suitable manner. For example, in some embodiments, the processor can determine that it is at the end of the data when it has reached a certain memory address, when a stream of data has stopped, when it has reached the end of a file, etc. If process 200 determines that it is not at the end of the data, then the process can select the next piece of data as described above in connection with 212. Otherwise, process 200 can identify the data as not containing an ROP payload at 234 and end at 236.

If at 222, however, it is determined that the count of the total number of instructions executed in the present attempt is below a threshold, then process 200 can determine at 226 whether one or more operations that indicates that an intentional execution of gadgets according to an ROP payload has taken place. Any suitable operation(s) may be used to indicate that an intentional execution of gadgets according to an ROP payload has taken place in some embodiments. For example, in some embodiments, an operation that distinguishes between accidental execution of random instruction sequences and intentional execution of gadgets according to an ROP payload can be used in some embodiments.

In accordance with some embodiment, the determination at 226 can be made using any suitable runtime heuristic for identifying execution behavior of an ROP payload. For example, in some embodiments, an indirect control transfer instruction that is controlled by original data (i.e., the original data of a suspected ROP payload) can be an operation that indicates that an intentional execution of gadgets according to an ROP payload has taken place.

For example, as described above in connection with FIG. 1, the "ret" (return) instruction at the end of the first gadget call (marked "1st" on the right side of FIG. 1) causes the value at the address pointed to by the stack pointer (ESP) to be put into the instruction pointer (EIP) and causes ESP to be incremented by one address size. This "ret" command thus sets up the next gadget call (marked "2nd" on the right side of FIG. 1) at address 070015BB (which is specified in the original data) by setting the instruction pointer with the value (070015BB) at the address (X+n*2) of the original data pointed to by ESP. This "ret" instruction can thus be an operation that indicates that an intentional execution of gadgets according to an ROP payload has taken place.

As another example, in some embodiments, if, during the execution of an instruction sequence, a "jmp eax" instruction transfers control to another valid location in the gadget space, but the value of EAX has not been loaded from the data, then this sequence can be identified as not being such an operation.

As yet another example, consider a relative call instruction that transfers control a few bytes further from a current location of EIP, followed at some point by a "ret" instruction. In this case, the "ret" instruction would not denote such an operation (although it reads an address from the payload and jumps to it), because the value read is not the original value that existed at that location of the data, but is instead the return address pushed at runtime by the call instruction.

If it is determined at 226 that an operation that indicates that an intentional execution of gadgets according to an ROP payload has not taken place, then process 200 can loop back to 214 to continue attempting to execute instructions in the one or more gadget address space(s).

Otherwise, process 200 can increment the gadget count at 228 and then determine, at 230, whether the gadget count has reached and/or exceeded a threshed. This gadget count can be incremented in any suitable manner. For example, in some embodiments, the gadget count can be incremented upon the completion of each gadget. As another example, in some embodiments, the gadget count can be incremented only upon the completion of each unique gadget (e.g., a gadget that has not previously been executed). As yet another example, in some embodiments, the gadget count can be incremented only upon the completion of each unique gadget having two (or any other suitable number) or more instructions. Any suitable threshold can be used in some embodiments. For example, a threshold of four to eight (e.g., six) unique gadgets can be used in some embodiments.

If it is determined at 230 that the gadget count has not reached and/or exceeded the threshold, then process 200 can loop back to 214 to continue attempting to execute instructions in the one or more gadget address space(s). Otherwise, process 200 can identify the data as containing an ROP payload at 232 and end at 236.

Figure 1:
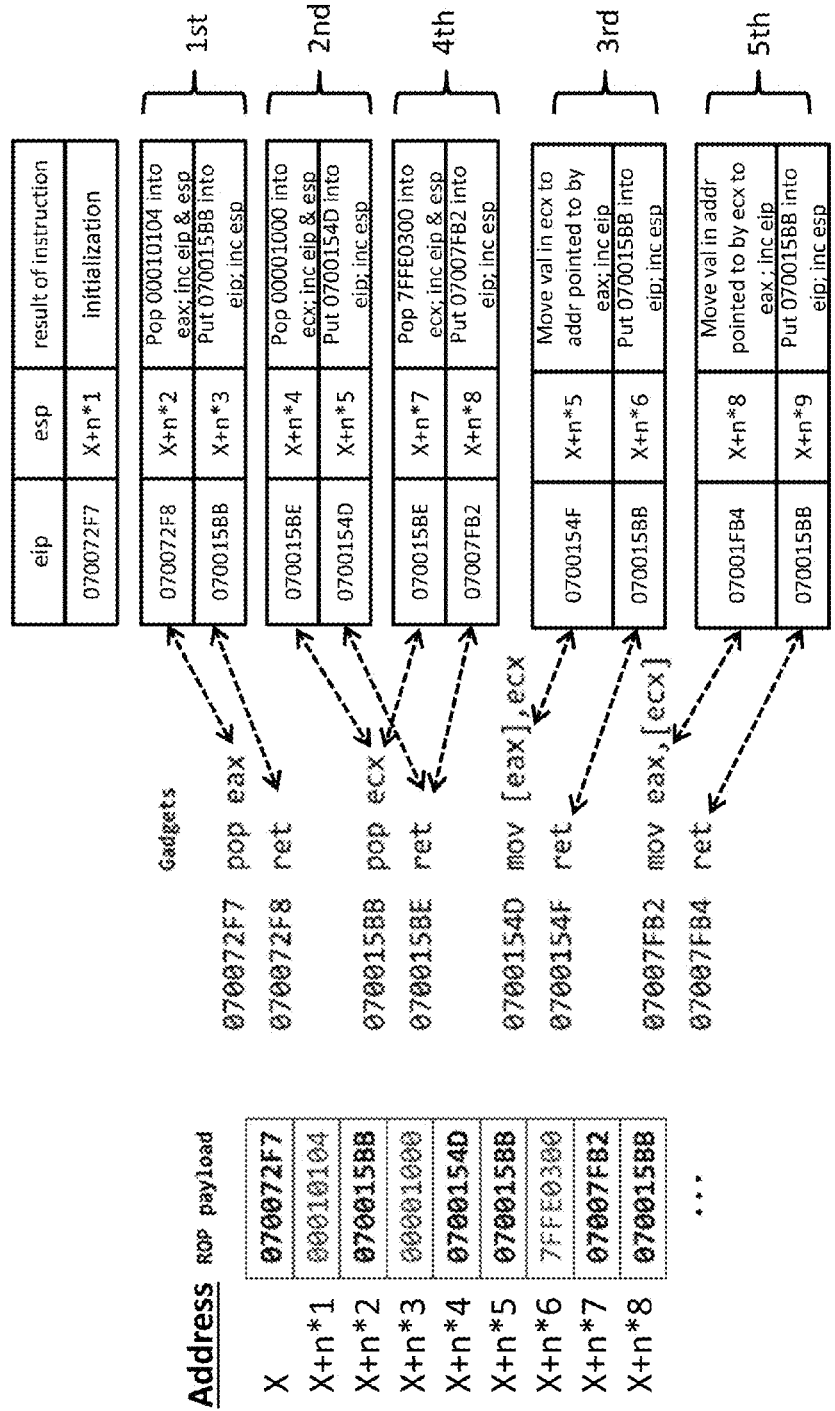
FIG. 1 is an illustration of a return-oriented programming (ROP) payload controlling the execution of gadgets in accordance with the prior art.
Figure 3:
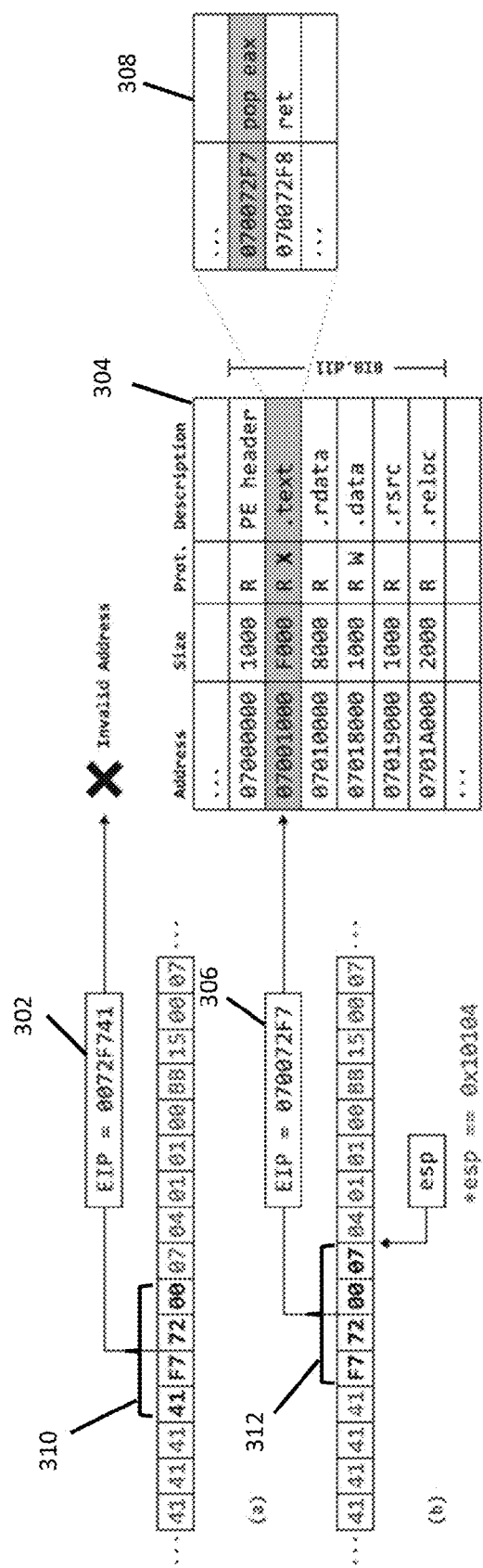
FIG. 3 is an illustration of example actions that can be performed on data to determine if it includes an ROP payload in accordance with some embodiments.
Figure 4:
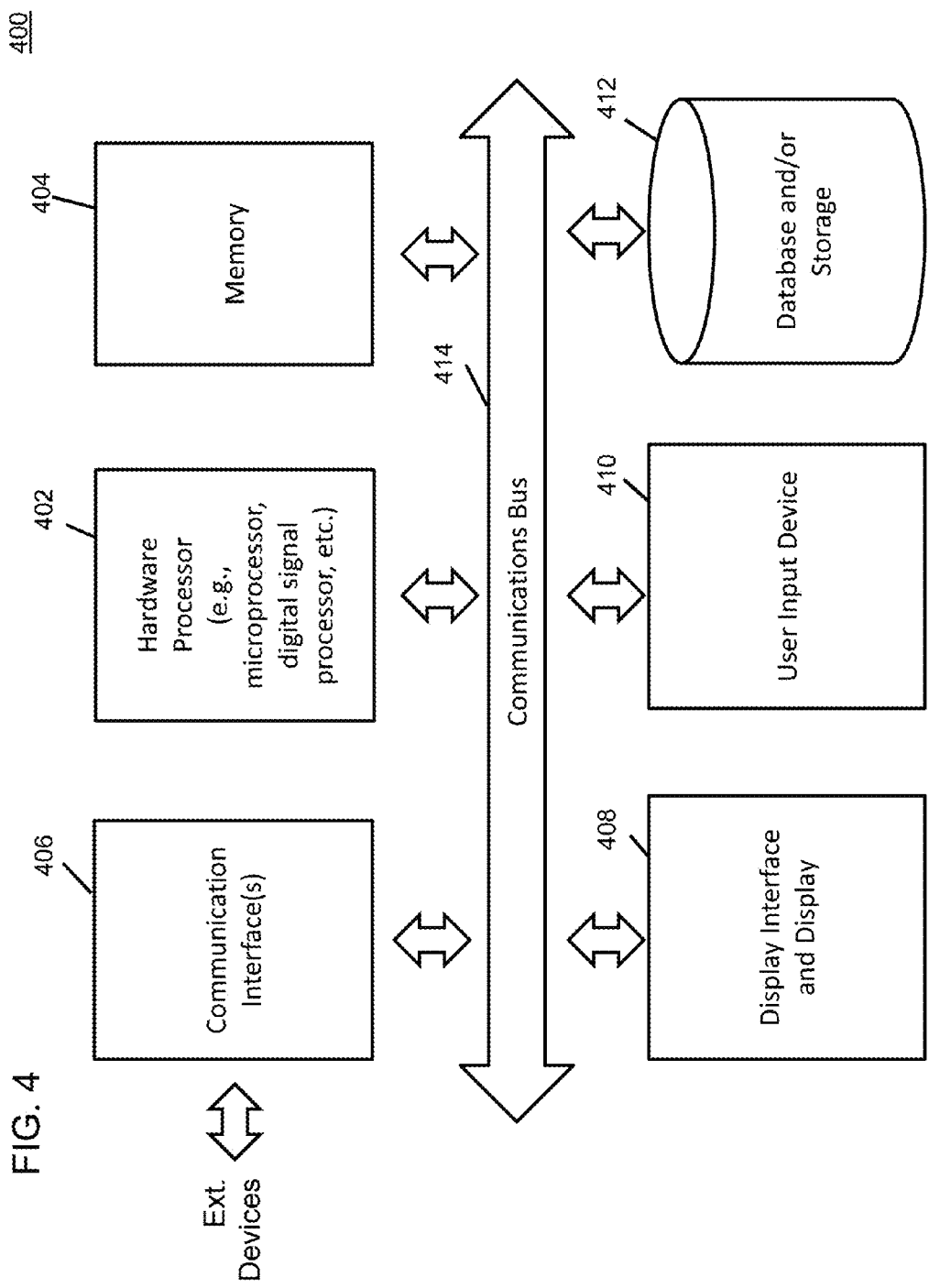
FIG. 4 is a diagram of an example of hardware that can be used for detecting ROP payloads in accordance with some embodiments.

In accordance with some embodiments, any suitable hardware and/or software can be used to perform the mechanisms described herein (such as those illustrated in, and described in connection with, FIGS. 1, 2, and 3). For example, a general purpose device such as a computer or a special purpose device such as a client, a server, etc. can be used to execute software for performing the mechanisms described herein. Any of these general or special purpose devices, such as device 400 of FIG. 4, can include any suitable components such as a hardware processor 402 (which can be a microprocessor, digital signal processor, a controller, etc.), memory 404, communication interfaces 406, a display interface and display 408, user input devices 410, a database and/or storage 412, a communications bus 414, etc. Communications interfaces 406 can enable the hardware and/or software to communicate with other communications networks (e.g., such as the Internet, wired networks, wireless networks, etc.), other devices, etc. This hardware and/or software can be implemented as part of other equipment or can be implemented as stand-alone equipment. Any of these devices can include an emulator, whether implemented in hardware and/or software.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow. Features of the disclosed embodiments can be combined and rearranged in various ways.

What is claimed is:

1. A system for detecting the presence of a return-oriented programming (ROP) payload in data, comprising:
 a hardware processor that:
  identifies a potential gadget address space;
  determines if a piece of the data corresponds to an address of the potential gadget address space; and
  in response to determining that the piece of the data corresponds to an address of the potential gadget address space:
   for each instruction of a plurality of instructions beginning at the address:
    attempts to execute the instruction;
    determines whether at least one of: that the instruction has an invalid execution address; that the instruction is invalid; and that the instruction is privileged;
    counts the instruction as part of an instruction count; and
    determines whether the instruction count meets at least one threshold;
   in response to determining that the instruction count meets the at least one threshold, increases a gadget count; and
   indicates that an ROP payload is present in the data in response to the gadget count meeting a threshold greater than one.

2. The system of claim 1, wherein in determining whether at least one of: that the instruction has an invalid execution address; that the instruction is invalid; and that the instruction is privileged, the hardware processor determines whether the instruction is invalid.

3. The system of claim 1, wherein in attempting to execute the instruction, the hardware processor attempts to execute the instruction using an emulator.

4. The system of claim 1, wherein in determining whether at least one of: that the instruction has an invalid execution address; that the instruction is invalid; and that the instruction is privileged, the hardware processor determines whether the instruction has an invalid execution address.

5. The system of claim 1, wherein in determining whether at least one of: that the instruction has an invalid execution address; that the instruction is invalid; and that the instruction is privileged, the hardware processor determines whether the instruction is a privileged instruction.

6. The system of claim 1, wherein the hardware processor determines if an indirect control transfer instruction that is controlled by an unchanged piece of the data is effected.

7. The system of claim 1, wherein the hardware processor determines if a return instruction that is controlled by an unchanged piece of the data is effected.

8. The system of claim 1, wherein the instruction count is a count of the number of instructions in a gadget.

9. The system of claim 1, wherein the instruction count is a count of the total number of instructions executed.

10. A method for detecting the presence of a return-oriented programming (ROP) payload in data, comprising:
identifying a potential gadget address space using a hardware processor;
determining if a piece of the data corresponds to an address of the potential gadget address space using the hardware processor; and
in response to determining that the piece of the data corresponds to an address of the potential gadget address space:
for each instruction of a plurality of instructions beginning at the address, using the hardware processor to:
attempt to execute the instruction;
determine whether at least one of: that the instruction has an invalid execution address; that the instruction is invalid; and that the instruction is privileged;
count the instruction as part of an instruction count; and
determine whether the instruction count meets at least one threshold;
in response to determining that the instruction count meets the at least one threshold, using the hardware processor to increase a gadget count; and
indicating, using the hardware processor, that an ROP payload is present in the data in response to the gadget count meeting a threshold greater than one.

11. The method of claim 10, wherein determining whether at least one of: that the instruction has an invalid execution address; that the instruction is invalid; and that the instruction is privileged comprises determining whether the instruction is invalid.

12. The method of claim 10, wherein attempting to execute the instruction comprises attempting to execute the instruction using an emulator.

13. The method of claim 10, wherein determining whether at least one of: that the instruction has an invalid execution address; that the instruction is invalid; and that the instruction is privileged comprises determining whether the instruction has an invalid execution address.

14. The method of claim 10, wherein determining whether at least one of: that the instruction has an invalid execution address; that the instruction is invalid; and that the instruction is privileged comprises determining whether the instruction is a privileged instruction.

15. The method of claim 10, further comprising determining if an indirect control transfer instruction that is controlled by an unchanged piece of the data is effected.

16. The method of claim 10, further comprising determining if a return instruction that is controlled by an unchanged piece of the data is effected.

17. The method of claim 10, wherein the instruction count is a count of the number of instructions in a gadget.

18. The method of claim 10, wherein the instruction count is a count of the total number of instructions executed.

19. A non-transitory computer-readable medium containing computer-executable instructions that, when executed by a processor, cause the processor to perform a method for detecting the presence of a return-oriented programming (ROP) payload in data, the method comprising:
identifying a potential gadget address space;
determining if a piece of the data corresponds to an address of the potential gadget address space; and
in response to determining that the piece of the data corresponds to an address of the potential gadget address space:
for each instruction of a plurality of instructions beginning at the address:
attempting to execute the instruction;
determining whether at least one of: that the instruction has an invalid execution address; that the instruction is invalid; and that the instruction is privileged;
counting the instruction as part of an instruction count; and
determining whether the instruction count meets at least one threshold;
in response to determining that the instruction count meets the at least one threshold, increasing a gadget count; and
indicating that an ROP payload is present in the data in response to the gadget count meeting a threshold greater than one.

20. The non-transitory computer readable medium of claim 19, wherein determining whether at least one of: that the instruction has an invalid execution address; that the instruction is invalid; and that the instruction is privileged comprises determining whether the instruction is invalid.

21. The non-transitory computer-readable medium of claim 19, wherein attempting to execute the instruction comprises attempting to execute the instruction using an emulator.

22. The non-transitory computer-readable medium of claim 19, wherein determining whether at least one of: that the instruction has an invalid execution address; that the instruction is invalid; and that the instruction is privileged comprises determining whether the instruction has an invalid execution address.

23. The non-transitory computer-readable medium of claim 19, wherein determining whether at least one of: that the instruction has an invalid execution address; that the instruction is invalid; and that the instruction is privileged comprises determining whether the instruction is a privileged instruction.

24. The non-transitory computer-readable medium of claim 19, wherein the method further comprises determining if an indirect control transfer instruction that is controlled by an unchanged piece of the data is effected.

25. The non-transitory computer-readable medium of claim 19, wherein the method further comprises determining if a return instruction that is controlled by an unchanged piece of the data is effected.

26. The non-transitory computer-readable medium of claim 19, wherein the instruction count is a count of the number of instructions in a gadget.

27. The non-transitory computer-readable medium of claim 19, wherein the instruction count is a count of the total number of instructions executed.

* * * * *

UNITED STATES PATENT AND TRADEMARK OFFICE
CERTIFICATE OF CORRECTION

PATENT NO. : 10,192,049 B2
APPLICATION NO. : 15/349445
DATED : January 29, 2019
INVENTOR(S) : Michalis Polychronakis and Angelos D. Keromytis It is certified that error appears in the above-identified patent and that said Letters Patent is hereby corrected as shown below:

In the Specification

Column 1, Line 26-31, should read:
--This invention was made with government support under 0914312 awarded by the National Science Foundation, FA8750-10-2-0253 awarded by the Air Force Research Laboratory, and FA8650-10-C-7024 awarded by the Air Force Materiel Command Legal Office. The government has certain rights in the invention.--

Signed and Sealed this
Twenty-second Day of September, 2020

Andrei Iancu
*Director of the United States Patent and Trademark Office*